United States Patent
Thurman et al.

(10) Patent No.: US 9,656,143 B2
(45) Date of Patent: *May 23, 2017

(54) BASKETBALL SHOT DETERMINATION SYSTEM

(71) Applicant: Wilson Sporting Goods Co., Chicago, IL (US)

(72) Inventors: Robert T. Thurman, Plainfield, IL (US); Kevin L. Krysiak, Palatine, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/204,932

(22) Filed: Mar. 11, 2014

(65) Prior Publication Data

US 2014/0195022 A1 Jul. 10, 2014

Related U.S. Application Data

(63) Continuation-in-part of application No. 14/071,384, filed on Nov. 4, 2013.

(Continued)

(51) Int. Cl.
*A63B 67/00* (2006.01)
*A63B 69/00* (2006.01)
(Continued)

(52) U.S. Cl.
CPC .......... *A63B 69/0071* (2013.01); *A63B 41/02* (2013.01); *A63B 43/00* (2013.01);
(Continued)

(58) Field of Classification Search
CPC ........................... A63B 67/002; A63B 2208/12
(Continued)

(56) References Cited

U.S. PATENT DOCUMENTS 2,020,484 A 11/1935 Turner ............................ 240/6.4
2,307,362 A 1/1943 Dupler .............................. 240/2
(Continued)

FOREIGN PATENT DOCUMENTS

WO 2007084850 A2 7/2007

OTHER PUBLICATIONS

Anonymous: "94Fifty Sensor Basketball", Mar. 4, 2013 (Mar. 4, 2013), pp. 1-6, XP055134703, Retrieved from the Internet: URL: https://web.archive.org/web/20130304204531/http://www.infomotionsports.com/products/94fifty-sensor-basketball/[retrieved on Aug. 13, 2014] pp. 2-5.

(Continued)

*Primary Examiner* — William H McCulloch, Jr.
*Assistant Examiner* — Chase Leichliter
(74) *Attorney, Agent, or Firm* — Terence P. O'Brien; Todd A. Rathe

(57) ABSTRACT

A basketball shot determination system for use with a basket and a portable electronic device including a data acquisition device, a processing unit, a memory and an output device, the system includes a basketball, at least one sensor carried by the basketball, and a non-transient computer-readable medium. The medium contains code to direct the processor to obtain at least one attribute of a shot of the basketball towards the basket from the data acquisition device. The at least one attribute is sensed by the sensor or derived from signal output by the sensor. The medium contains code to direct the processor to determine whether the shot is a made basket by comparing the at least one attribute of the shot to one or more predetermined signature characteristics of a made basket, and to present output to a person based on the determination of whether the shot is a made basket.

21 Claims, 16 Drawing Sheets

Related U.S. Application Data

(60) Provisional application No. 61/724,668, filed on Nov. 9, 2012, provisional application No. 61/798,738, filed on Mar. 15, 2013, provisional application No. 61/788,304, filed on Mar. 15, 2013, provisional application No. 61/799,851, filed on Mar. 15, 2013, provisional application No. 61/800,972, filed on Mar. 15, 2013, provisional application No. 61/891,487, filed on Oct. 16, 2013.

(51) Int. Cl.
| | |
|---|---|
| *G09B 19/00* | (2006.01) |
| *A63B 41/02* | (2006.01) |
| *A63B 43/00* | (2006.01) |
| *A63B 43/06* | (2006.01) |
| *A63B 71/06* | (2006.01) |
| *A63B 102/18* | (2015.01) |

(52) U.S. Cl.
CPC .......... *A63B 43/06* (2013.01); *G09B 19/0038* (2013.01); *A63B 67/002* (2013.01); *A63B 2071/0625* (2013.01); *A63B 2102/18* (2015.10); *A63B 2102/182* (2015.10); *A63B 2208/12* (2013.01); *A63B 2220/12* (2013.01); *A63B 2220/13* (2013.01); *A63B 2220/30* (2013.01); *A63B 2220/35* (2013.01); *A63B 2220/40* (2013.01); *A63B 2220/72* (2013.01); *A63B 2225/20* (2013.01); *A63B 2225/50* (2013.01); *A63B 2243/007* (2013.01); *A63B 2243/0066* (2013.01); *A63B 2243/0095* (2013.01)

(58) Field of Classification Search
USPC .......................................................... 473/415
See application file for complete search history.

(56) References Cited

U.S. PATENT DOCUMENTS

| | | | | |
|---|---|---|---|---|
| 2,849,819 | A | 9/1958 | Murphy et al. | 46/230 |
| 2,871,343 | A | 1/1959 | Whitney | 240/10 |
| 2,903,820 | A | 9/1959 | Bodell | 46/228 |
| 3,011,048 | A | 11/1961 | O'Brien | 240/6.4 |
| 3,351,347 | A | 4/1964 | Smith et al. | 273/213 |
| 3,229,976 | A | 1/1966 | Allen, Jr. | 273/58 |
| 3,304,651 | A | 2/1967 | Deyerl | 46/228 |
| 3,458,205 | A | 7/1969 | Smith et al. | 273/213 |
| 3,521,886 | A | 7/1970 | Bosco | 273/138 |
| 3,580,575 | A | 5/1971 | Speeth | 273/58 |
| 3,610,916 | A | 10/1971 | Meehan | 240/6.4 |
| 3,745,677 | A | 7/1973 | Moran | 40/126 |
| 3,786,246 | A | 1/1974 | Johnson et al. | 240/6.4 |
| 3,804,411 | A | 4/1974 | Hendry | 273/58 |
| 3,935,669 | A | 2/1976 | Potrzuski et al. | 46/228 |
| 4,002,893 | A | 1/1977 | Newcomb et al. | 240/6.4 |
| 4,133,528 | A | 1/1979 | Koblick | 273/65 |
| 4,479,649 | A | 10/1984 | Newcomb et al. | 273/61 |
| 4,542,445 | A | 9/1985 | Marletta | 362/96 |
| 4,563,160 | A | 1/1986 | Lee | 446/47 |
| 4,607,850 | A | 8/1986 | O'Riley | 273/424 |
| 4,701,146 | A | 10/1987 | Swenson | 446/130 |
| 4,776,589 | A | 10/1988 | Yang | 273/58 |
| 4,801,141 | A | 1/1989 | Rumsey | 273/1 |
| 4,904,981 | A * | 2/1990 | Mele | G07C 1/28 340/323 B |
| 4,963,117 | A | 10/1990 | Gualdoni | 446/219 |
| 4,967,596 | A | 11/1990 | Rilling et al. | 73/492 |
| 4,997,403 | A | 3/1991 | Akman | 446/220 |
| 4,999,603 | A | 3/1991 | Mele et al. | |
| 5,039,977 | A | 8/1991 | Mele et al. | |
| 5,054,778 | A | 10/1991 | Maleyko | 273/58 |
| 5,066,011 | A | 11/1991 | Dykstra et al. | 273/58 |
| 5,066,012 | A | 11/1991 | Stark | 273/65 |
| 5,071,122 | A | 12/1991 | Messina | 273/26 |
| 5,080,359 | A | 1/1992 | Thill | 273/60 |
| 5,102,131 | A | 4/1992 | Remington et al. | 273/58 |
| 5,170,664 | A | 12/1992 | Hirsh et al. | 73/493 |
| 5,186,458 | A | 2/1993 | Redondo | 273/65 |
| 5,228,686 | A | 7/1993 | Maleyko | 273/58 |
| 5,236,383 | A | 8/1993 | Connelly | 446/219 |
| 5,319,531 | A | 6/1994 | Kutnyak | 362/184 |
| 5,388,825 | A | 2/1995 | Myers et al. | 273/58 |
| 5,403,000 | A | 4/1995 | Woosley | 273/1.5 |
| 5,564,702 | A | 10/1996 | Meffert | 273/153 |
| 5,609,411 | A | 3/1997 | Wang | 362/234 |
| 5,639,076 | A | 6/1997 | Cmiel et al. | 473/570 |
| 5,683,316 | A | 11/1997 | Campbell | 473/570 |
| 5,694,340 | A | 12/1997 | Kim | |
| 5,725,445 | A | 3/1998 | Kennedy et al. | 473/570 |
| 5,776,018 | A * | 7/1998 | Simpson | A63B 24/0021 473/433 |
| 5,820,484 | A | 10/1998 | Terry | 473/356 |
| 5,882,204 | A | 3/1999 | Iannazo et al. | |
| 5,888,156 | A | 3/1999 | Cmiel et al. | 473/570 |
| 6,073,086 | A | 6/2000 | Marinelli | 702/141 |
| 6,142,894 | A | 11/2000 | Lee | 473/570 |
| 6,148,271 | A | 11/2000 | Marinelli | 702/141 |
| 6,151,563 | A | 11/2000 | Marinelli | 702/141 |
| 6,157,898 | A | 12/2000 | Marinelli | 702/141 |
| 6,224,493 | B1 | 5/2001 | Lee et al. | 473/223 |
| 6,251,035 | B1 | 6/2001 | Fa | 473/570 |
| 6,389,368 | B1 * | 5/2002 | Hampton | A63B 24/0021 473/479 |
| 6,428,432 | B1 | 8/2002 | Kachel | 473/570 |
| 6,482,071 | B1 | 11/2002 | Wilgosz | 446/486 |
| 6,547,623 | B1 | 4/2003 | Collado | 446/47 |
| 6,572,492 | B2 | 6/2003 | Tinsman | |
| 6,726,580 | B2 | 4/2004 | Peterson | 473/570 |
| 6,780,130 | B1 | 8/2004 | Monochello | 473/570 |
| 7,014,581 | B2 | 3/2006 | Ng | 473/570 |
| 7,021,140 | B2 | 4/2006 | Perkins | 73/493 |
| 7,140,248 | B1 | 11/2006 | Brundage | 73/492 |
| 7,148,583 | B1 | 12/2006 | Shau et al. | |
| 7,179,181 | B2 | 2/2007 | Ko | 473/570 |
| 7,234,351 | B2 | 6/2007 | Perkins | 73/493 |
| 7,288,037 | B2 | 10/2007 | Myers | 473/613 |
| 7,719,469 | B2 | 5/2010 | Englert et al. | 342/418 |
| 7,727,097 | B2 | 6/2010 | Siegel et al. | 473/577 |
| 7,740,551 | B2 | 6/2010 | Nurnberg et al. | 473/570 |
| 7,795,861 | B2 | 9/2010 | Englert et al. | 324/207.17 |
| 7,811,163 | B2 | 10/2010 | Ratcliffe | |
| 7,867,115 | B2 | 1/2011 | Zawitz | 473/570 |
| 7,891,666 | B2 | 2/2011 | Kuenzler et al. | 273/317 |
| 7,915,887 | B2 | 3/2011 | Englert et al. | 324/207.16 |
| 7,927,253 | B2 | 4/2011 | Vincent et al. | 482/9 |
| 8,010,105 | B2 | 8/2011 | Buckley et al. | |
| 8,036,826 | B2 | 10/2011 | MacIntosh et al. | 701/213 |
| 8,057,328 | B2 | 11/2011 | Englert | 473/479 |
| 8,070,620 | B2 | 12/2011 | Rankin | 473/222 |
| 8,079,925 | B2 | 12/2011 | Englert et al. | 473/570 |
| 8,172,722 | B2 | 5/2012 | Molyneux et al. | 482/1 |
| 8,221,290 | B2 | 7/2012 | Vinvent et al. | 482/8 |
| 8,228,056 | B2 | 7/2012 | Bucher | 324/207.16 |
| 8,231,487 | B2 | 7/2012 | Nurnberg et al. | 473/570 |
| 8,231,506 | B2 | 7/2012 | Molyneux et al. | 482/1 |
| 8,340,740 | B2 | 12/2012 | Holzer et al. | |
| 8,353,791 | B2 | 1/2013 | Holthouse et al. | 473/415 |
| 8,439,773 | B2 | 5/2013 | Silagy | 473/447 |
| 8,506,430 | B2 | 8/2013 | Von Der Gruen et al. | 473/570 |
| 8,512,177 | B2 | 8/2013 | Krysiak et al. | 473/570 |
| 8,517,870 | B2 | 8/2013 | Crowley et al. | 473/570 |
| 8,535,185 | B2 | 9/2013 | Englert | |
| 8,562,487 | B2 | 10/2013 | Berggren et al. | 482/1 |
| 8,579,632 | B2 | 11/2013 | Crowley | |
| 8,597,095 | B2 | 12/2013 | Crowley et al. | |
| 8,617,008 | B2 | 12/2013 | Marty et al. | 473/447 |
| 8,622,832 | B2 | 1/2014 | Marty et al. | 463/36 |
| 8,678,897 | B2 | 3/2014 | Englert et al. | |
| 8,725,452 | B2 | 5/2014 | Han | |
| 8,758,172 | B2 | 6/2014 | Creuger | |
| 8,781,610 | B2 | 7/2014 | Han | |

(56) References Cited

U.S. PATENT DOCUMENTS

| | | | |
|---|---|---|---|
| 8,903,521 B2 | 12/2014 | Goree et al. | |
| 8,905,855 B2 | 12/2014 | Fitzpatrick et al. | |
| 8,941,723 B2 | 1/2015 | Bentley et al. | |
| 8,944,928 B2 | 2/2015 | Kaps et al. | |
| 8,944,939 B2 | 2/2015 | Clark et al. | |
| 8,951,106 B2 | 2/2015 | Crowley et al. | |
| 8,989,441 B2 | 3/2015 | Han et al. | |
| 2002/0123386 A1 | 9/2002 | Perlmutter | 473/223 |
| 2002/0137582 A1 | 9/2002 | Yu | 473/570 |
| 2003/0054905 A1 | 3/2003 | King, Jr. | |
| 2003/0073518 A1* | 4/2003 | Marty | A63B 24/0021 473/416 |
| 2003/0224885 A1 | 12/2003 | Leal et al. | 473/570 |
| 2005/0288133 A1 | 12/2005 | Rudell | |
| 2005/0288134 A1 | 12/2005 | Smith | 473/570 |
| 2007/0026974 A1* | 2/2007 | Marty | A63B 24/0021 473/467 |
| 2007/0026975 A1* | 2/2007 | Marty | A63B 24/0021 473/467 |
| 2007/0074752 A1 | 4/2007 | Shau et al. | |
| 2007/0167266 A1 | 7/2007 | Devall | |
| 2007/0281811 A1 | 12/2007 | Wang | 473/570 |
| 2008/0088303 A1 | 4/2008 | Englert | 324/226 |
| 2008/0174281 A1 | 7/2008 | Shau | |
| 2008/0254866 A1* | 10/2008 | Young | A63B 24/0021 463/25 |
| 2008/0312010 A1* | 12/2008 | Marty | A63B 24/0003 473/447 |
| 2009/0029754 A1* | 1/2009 | Slocum | A63B 24/0087 463/5 |
| 2009/0040761 A1 | 2/2009 | Huang et al. | 362/253 |
| 2009/0062033 A1 | 3/2009 | Harada | 473/353 |
| 2009/0111616 A1* | 4/2009 | Creelman | A63B 24/0021 473/415 |
| 2009/0191990 A1 | 7/2009 | Smith | 473/570 |
| 2009/0210078 A1 | 8/2009 | Crowley | 700/91 |
| 2009/0325739 A1* | 12/2009 | Gold | A63B 43/00 473/570 |
| 2010/0035710 A1 | 2/2010 | Smith | 473/570 |
| 2010/0036753 A1 | 2/2010 | Harvill et al. | |
| 2010/0050082 A1* | 2/2010 | Katz | H04N 5/272 715/719 |
| 2010/0069181 A1 | 3/2010 | Lin | 473/570 |
| 2010/0113189 A1* | 5/2010 | Blair | A63B 63/083 473/433 |
| 2010/0130314 A1 | 5/2010 | Von der Gruen et al. | |
| 2010/0130315 A1 | 5/2010 | Steidle | 473/570 |
| 2010/0184563 A1 | 7/2010 | Molyneux et al. | 482/1 |
| 2010/0198043 A1 | 8/2010 | Holzer et al. | 600/388 |
| 2010/0211198 A1* | 8/2010 | Ressler | G06Q 30/00 700/91 |
| 2010/0261557 A1 | 10/2010 | Joseph et al. | |
| 2011/0013087 A1* | 1/2011 | House | A63B 24/0021 348/564 |
| 2011/0118062 A1 | 5/2011 | Krysiak et al. | |
| 2011/0118064 A1 | 5/2011 | Krysiak et al. | 473/603 |
| 2011/0118065 A1 | 5/2011 | Krysiak et al. | 473/603 |
| 2011/0119022 A1 | 5/2011 | Kuenzler et al. | 702/145 |
| 2011/0136603 A1 | 6/2011 | Lin et al. | 473/570 |
| 2011/0212798 A1 | 9/2011 | Zawitz | |
| 2011/0269517 A1 | 11/2011 | Englert et al. | 463/7 |
| 2011/0304497 A1* | 12/2011 | Molyneux | A43B 1/0054 342/42 |
| 2011/0316529 A1 | 12/2011 | Stancil et al. | |
| 2012/0029666 A1 | 2/2012 | Crowley et al. | 700/91 |
| 2012/0040785 A1 | 2/2012 | DeSort | 473/570 |
| 2012/0058845 A1 | 3/2012 | Crowley et al. | 473/604 |
| 2012/0071282 A1 | 3/2012 | Smith | 473/570 |
| 2012/0139493 A1 | 6/2012 | Sakurai et al. | |
| 2012/0212505 A1* | 8/2012 | Burroughs | G06F 19/3481 345/629 |
| 2012/0244969 A1 | 9/2012 | Binder | 473/570 |
| 2012/0262329 A1 | 10/2012 | Molyneux | |
| 2012/0277890 A1 | 11/2012 | Han | 700/91 |
| 2012/0278023 A1 | 11/2012 | Han | 702/87 |
| 2012/0322587 A1* | 12/2012 | Duke | A63B 69/0071 473/450 |
| 2013/0005512 A1 | 1/2013 | Joseph et al. | |
| 2013/0023365 A1 | 1/2013 | Idoni-Matthews et al. | 473/570 |
| 2013/0068017 A1 | 3/2013 | Perkins et al. | 73/504.02 |
| 2013/0073247 A1 | 3/2013 | Perkins et al. | 702/141 |
| 2013/0073248 A1 | 3/2013 | Perkins et al. | 702/141 |
| 2013/0085006 A1 | 4/2013 | Nilwong et al. | 473/125 |
| 2013/0090750 A1 | 4/2013 | Herrman et al. | 700/92 |
| 2013/0167290 A1 | 7/2013 | Ben Ezra | 2/425 |
| 2013/0274040 A1* | 10/2013 | Coza | G09B 19/0038 473/570 |
| 2013/0274635 A1* | 10/2013 | Coza | G06F 19/3481 600/595 |
| 2014/0018181 A1 | 1/2014 | Blake et al. | 473/277 |
| 2014/0031151 A1 | 1/2014 | Crowley et al. | |
| 2014/0039651 A1 | 2/2014 | Crowley | |
| 2014/0081436 A1 | 3/2014 | Crowley et al. | |
| 2014/0120960 A1* | 5/2014 | Hohteri | A63B 71/0605 455/466 |
| 2014/0125806 A1 | 5/2014 | Kemppainen et al. | 348/157 |
| 2014/0128182 A1 | 5/2014 | Hohteri | 473/570 |
| 2014/0228155 A1 | 8/2014 | Hohteri | |
| 2014/0295874 A1 | 10/2014 | Hohteri et al. | |
| 2014/0303759 A1 | 10/2014 | Hohteri | |
| 2014/0342329 A1 | 11/2014 | Debenedetto et al. | |
| 2014/0375817 A1 | 12/2014 | Mescheter et al. | |
| 2015/0011343 A1 | 1/2015 | Krysiak et al. | |
| 2015/0112464 A1 | 4/2015 | Crowley et al. | |
| 2015/0165294 A1 | 6/2015 | Wackerly | |
| 2015/0382076 A1* | 12/2015 | Davisson | H04H 20/04 725/62 |
| 2016/0001136 A1* | 1/2016 | King | A63B 69/0071 320/108 |

OTHER PUBLICATIONS

Mike Crowley: "94Fifty: Freakishly Smart Sensor Basketballs", Mar. 14, 2013 (Mar. 14, 2013), pp. 1-12, XP055134700, Retrieved from the Internet: URL: https://web.archive.org/web/20130314184718/http:www/kickstarter.com/projects/490228395/94fifty-freakishly-smart-sensor-basketballs [retrieved on Aug. 13, 2014] p. 1-p. 8.

\* cited by examiner

460

| A(t) | | | P | R | T |
|---|---|---|---|---|---|
| X | Y | Z | | | |
| $P_{t0}$ $v_{1,0}$ $v_{2,0}$ $v_{3,0}$ | | | $P_{4,0}$ | MAKE | SWISH |
| $P_{t1}$ $v_{1,1}$ $v_{2,1}$ $v_{3,1}$ | | | $P_{4,1}$ | MAKE | BANK |
| $P_{t2}$ $v_{1,2}$ $v_{2,2}$ $v_{3,2}$ | | | $P_{4,2}$ | MAKE | RIM |
| • | • | • | • | • | • |
| $P_{tn}$ $v_{1,n}$ $v_{2,n}$ $v_{3,n}$ | | | $P_{4,n}$ | MAKE | ••• |

MSS

| A(t) | | | SA | SR | LD | | | LCOOR. | | | LA | | | MSS | | | $V_{BB}$ | $V_{R1}$ | $V_{R2}$ ... $V_{Rn}$ | R | TYPE |
|---|---|---|---|---|---|---|---|---|---|---|---|---|---|---|---|---|---|---|---|---|---|
| X | Y | Z | | | X | Y | Z | X | Y | Z | X | Y | Z | | | | | | | | |
| $v_{1,0}$ $v_{2,0}$ $v_{3,0}$ | | | $SA_0$ | $SR_0$ | $v_{4,0}$ $v_{5,0}$ $v_{6,0}$ | | | $v_{7,0}$ $v_{8,0}$ $v_{9,0}$ | | | $v_{10,0}$ $v_{11,0}$ $v_{12,0}$ | | | | | | $v_{13,0}$ | $v_{14,0}$ | $v_{15,0}$ ... $v_{n,0}$ | MAKE | SWISH |
| $v_{1,1}$ $v_{2,1}$ $v_{3,1}$ | | | $SA_1$ | $SR_1$ | $v_{4,1}$ $v_{5,1}$ $v_{6,1}$ | | | $v_{7,1}$ $v_{8,1}$ $v_{9,1}$ | | | $v_{10,1}$ $v_{11,1}$ $v_{12,1}$ | | | | | | $v_{13,1}$ | $v_{14,1}$ | $v_{15,1}$ $v_{n,1}$ | MAKE | BANK |
| $v_{1,2}$ $v_{2,2}$ $v_{3,2}$ | | | $SA_2$ | $SR_2$ | $v_{4,2}$ $v_{5,2}$ $v_{6,2}$ | | | $v_{7,2}$ $v_{8,2}$ $v_{9,2}$ | | | $v_{10,2}$ $v_{11,2}$ $v_{12,2}$ | | | | | | $v_{13,2}$ | $v_{14,2}$ | $v_{15,2}$ $v_{n,2}$ | MAKE | BANK +RIM |
| • | • | • | • | • | • | • | • | • | • | • | • | • | • | | | | • | • | • | • | • |
| $v_{1,n}$ $v_{2,n}$ $v_{3,n}$ | | | $SA_n$ | $SR_n$ | $v_{4,n}$ $v_{5,n}$ $v_{6,n}$ | | | $v_{7,n}$ $v_{8,n}$ $v_{9,n}$ | | | $v_{10,n}$ $v_{11,n}$ $v_{12,n}$ | | | | | | $v_{13,n}$ | $v_{14,n}$ | $v_{15,n}$ $v_{n,n}$ | MAKE | RIM |

FIG. 7

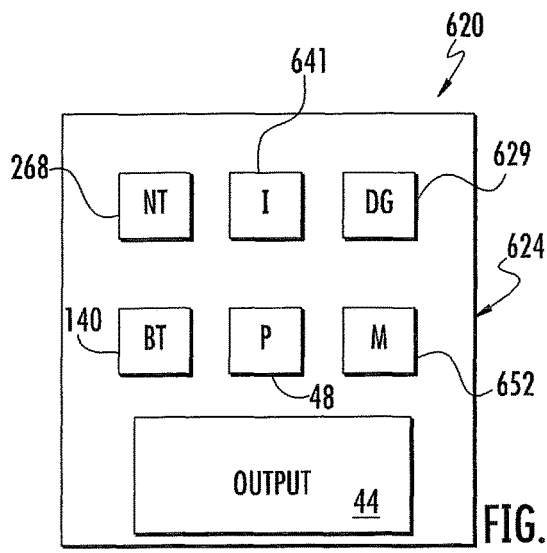
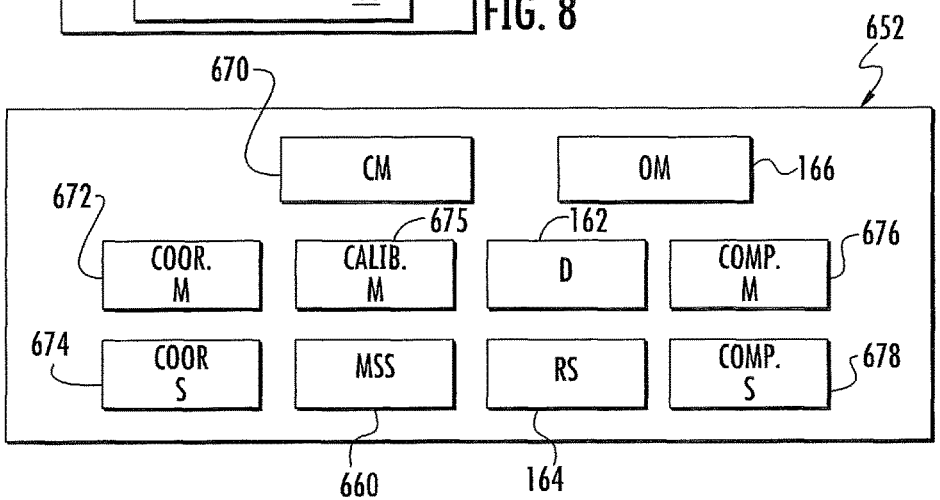
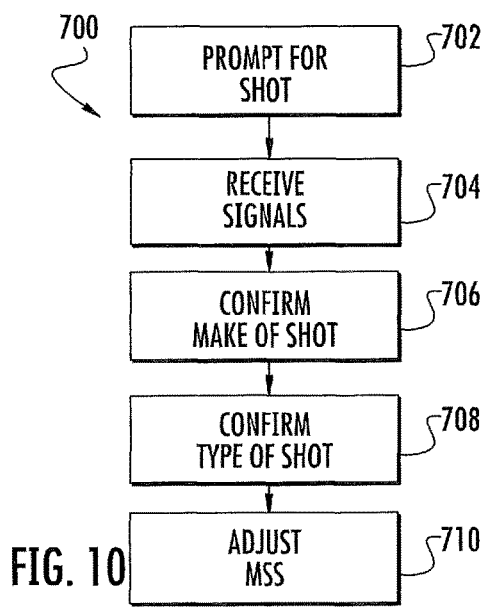

BASKETBALL SHOT DETERMINATION SYSTEM

The present application is a continuation-in-part of U.S. patent application Ser. No. 14/071,384 titled SPORT PERFORMANCE SYSTEM WITH BALL SENSING, and filed on Nov. 4, 2013, which claims priority to U.S. Provisional Patent Application Ser. No. 61/724,668 filed on Nov. 9, 2012. The present application also claims priority to U.S. Provisional Patent Application Ser. Nos. 61/798,738, 61/788,304, 61/799,851 and 61/800,972, filed on Mar. 15, 2013, which are hereby incorporated by reference in their entirety. The present invention also claims priority to U.S. Provisional Patent Application Ser. No. 61/891,487 filed on Oct. 16, 2013, which is hereby incorporated by reference in their entirety. The present application is related to co-pending U.S. patent application Ser. No. 14/204,709, Ser. No. 14/204,794, Ser. No. 14/204,880, Ser. No. 14/205,002 and Ser. No. 14/205,073 filed on the same day herewith, the full disclosure of which is hereby incorporated by reference.

BACKGROUND

The game of basketball is growing in popularity throughout the world. The game of basketball may be enjoyed by persons of all ages and may take many forms. The game of basketball may take the form of an organized game between organized teams, a pickup game at a local park or a game of horse in one's driveway. Regardless of what form the game of basketball takes, to be successful in the game of basketball requires the ability to make shots. Developing a proper shooting stroke and shooting touch is typically obtained through hours, weeks, months and years of practice. Such practice is often tedious and lacks sufficient feedback to facilitate optimal shooting skill improvement.

BRIEF DESCRIPTION OF THE DRAWINGS

FIG. 6 is a diagram of an example set of shot signatures of the system of FIGS. 1 and 3-5.

FIG. 7 is a diagram of another example set of shot signatures of the system of FIGS. 1 and 3-5.

FIG. 8 is a schematic diagram of another example implementation of the basketball sensing system of FIG. 1.

FIG. 9 is a schematic diagram of an example memory of the system of FIG. 8.

FIG. 10 is a flow diagram of an example calibration method that may be carried out by the system of FIG. 8.

FIG. 17A is a schematic illustration of an example electronic circuit chip of the basketball of FIG. 17.

DETAILED DESCRIPTION OF THE EXAMPLE EMBODIMENTS

Figure 1:
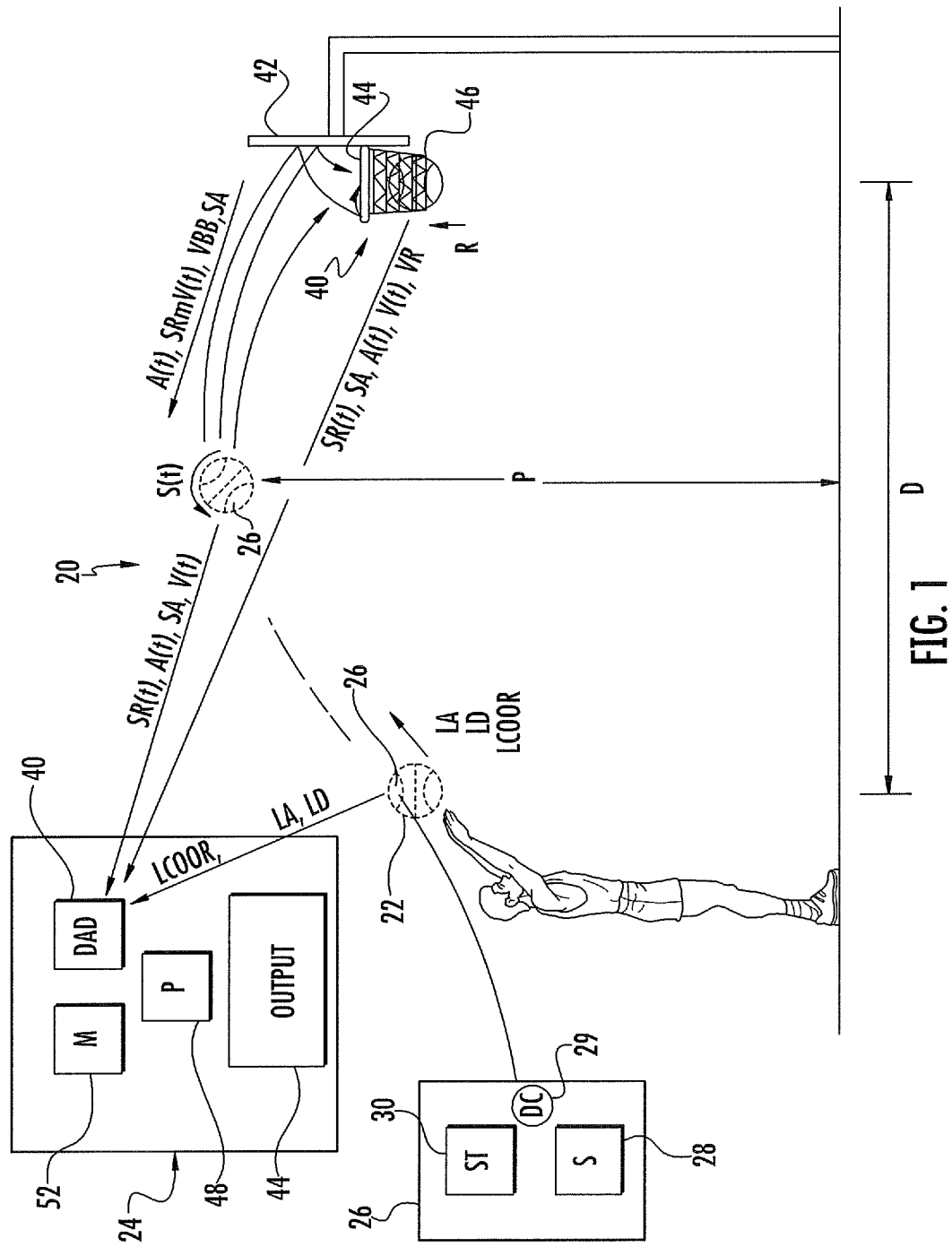
FIG. 1 is a schematic diagram of an example basketball sensing system.

FIG. 1 illustrates an example basketball sensing system 20. Basketball sensing system 20 determines whether a shot of a basketball is a made basket based upon signals received from at least one sensor located within a basketball. Basketball sensing system 20 allows a player to track his or her performance, to identify and distinguish characteristics of shots that are made versus shots that are missed and, in some implementations, to compare his or her performance with personal goals or performances of other players. The example shown in FIG. 1 is primarily directed toward basketballs, and many features are unique to basketballs. However, other aspects and features of the illustrated example are applicable to other sports games, such as, for example, American-style footballs, volleyballs, soccer balls, baseballs, softballs, lacrosse balls and rugby balls.

Basketball sensing system 20 comprises basketball 22 and portable electronic device 24. Basketball 22 carries at least one electronics package 26 which comprises at least one sensor 28, a data compression component 29 and at least one signal transmitter 30. The at least one sensor 28 (referred to as sensor 28) senses various attributes of a shot of a basketball towards a basket 40 having a backboard 42, a rim 44 and a net 46. In one implementation, sensor 28 senses one or more attributes of a shot such as travel or linear acceleration, spin axis, spin rate, launch velocity, launch direction, launch angle, launch coordinates, backboard vibration, rim vibration and the like. Vibration can be sensed through accelerometers and/or gyrometers wherein accelerations/decelerations, direction changes, or direction changes associated with the rim, backboard, net or lack thereof can be sensed. In one implementation, sensor 28 senses, and signal transmitter 30 outputs, values for attributes of a shot over time, indicating how the attribute is changing over time as a shot progresses through its lifecycle from the initial launch to interaction with one or more of backboard 42, rim 44 and net 46, or if the shot is an "airball", the lack of interaction with the backboard 42, rim 44 and net 46. For purposes of this disclosure, the term "raw sensed data" or "raw sensed motion data" means data signals or data values directly generated by sensor 28 with respect to motion of basketball 22, the positioning of basketball 22 or impact/vibrations experienced by basketball 22. The terms "raw sensed data" and "raw sensed motion data" encompass both compressed and uncompressed data values. The term "attribute of a shot" encompasses both raw sensed data and data or characteristics that have been derived from the raw sensed data. In one implementation, sensor 28 comprises accelerometers to detect motion such as acceleration and velocity. In one implementation, sensor 28 additionally or alternatively comprises gyrometers to sense spin axis and spin rate. One implementation, sensor 28 additionally or alternatively comprises a magnetometer, a GPS sensor or other device to facilitate position detection or change of direction of basketball 22. In yet other implementations, sensor 28 may comprise other sensing technologies.

Data compression component 29 comprises a device carried by basketball 22 for compression of data representing the sensed attributes of the shot. As a result, signal transmitter 30 more quickly and efficiently transmits larger amounts of data regarding attributes of the shot. In other implementations, data compression component 29 may be omitted.

Signal transmitter 30 transmits or outputs the sensed attributes of the shot to portable electronic device 24. Signal transmitter 30 comprises one or more devices to externally communicate the motion information or motion data sensed by sensor 28. In one implementation, signal transmitter 30 comprises a device to wirelessly transmit signals representing the sensed motion information. For example, in one implementation, signal transmitter 30 comprises a Bluetooth device. In another implementation, signal transmitter 30 comprises a Wi-Fi or other radiofrequency transmitter. In another implementation, signal transmitter 30 comprises an active read/write RFID tag which is written upon with data sensed by sensor 28, wherein signal transmitter 30 actively transmits signals from the tag. In yet another implementation, signal transmitter 30 comprises a passive read/write RFID tag which is written upon with data sent by sensor 28, wherein signal transmitter 30 is passively read by an external radiofrequency device reader. In another implementation, signal transmitter 30 comprises an infrared or other optical communication device. In yet other implementations, signal transmitter 30 may comprise other devices that communicate the sensed motion data to recipients external to basketball 22 in a wireless fashion.

In one implementation, electronics 26 carries out at least some data modifications and/or analysis prior to the data being externally transmitted to the portable electronic device. For example, electronics 26 may carry out some analysis or data derivations on the raw sensed motion information or on derived results of the raw sensed motion information prior to transmitting the modified, derived and/or compressed data to the portable electronic device before. For example, in some implementations, electronics 26 may itself analyze the raw sensed motion data to determine whether a particular shot was a made shot or a missed shot, wherein this determination is transmitted to portable electronic device 24 for tracking and further analysis. In other implementations, electronics 26 may transmit, in real time, raw signal data or raw sensed data directly from sensor 28 to the portable electronic device, wherein the portable electronic device performs analysis or further data derivation using the raw sensed motion data. In such an implementation, because the processing power is more greatly provided by the portable electronic device 24, rather than electronics 26 of basketball 22, the cost of basketball 22 may be kept low.

As will be described hereafter with respect to other figures, in some implementations, signal transmitter 30 may additionally or alternatively communicate the make/miss determinations or historical data in other fashions. For example, in one implementation, signal transmitter 30 comprises a plug-in or port by which the sensed motion data may be communicated externally from basketball 22 in a wired fashion. In another implementation, signal transmitter 30 may additionally or alternatively include one or more output mechanisms carried by basketball 22 for visually and/or audibly communicating information to a person. For example, in one implementation, signal transmitter 30 comprises a visual display, such as a digital or light emitting diode (LED) display visibly presenting sensed motion information and make/miss determinations. In another implementation, signal transmitter 30 comprises a speaker for producing audible signals communicating the sensed motion information and make/miss determinations. In yet another implementation, signal transmitter 30 comprises a light emitter that emits light that is visible on basketball 22, wherein the light being emitted changes in response to or based upon the sensed motion information or make/miss determinations.

Portable electronic device 24 comprises a device configured to receive signals output from signal transmitter 30 of sensor 26 of basketball 22 and to visibly present information based upon a determination of whether one or more basketball shots were made shots or missed shots. Examples of portable electronic device 24 include, but are not limited to, a smart phone, a flash memory reader (IPOD), a cell phone, a personal data assistant, a laptop computer, a tablet computer, an electronic wrist band, eyewear with display capabilities, a wrist-top computer, a netbook computer and the like. In one implementation, portable electronic device 24 may be configured similar to or provided as part of eyewear such as glasses with the display, a wristwatch, wrist-top computer, or wristband, permitting a player or user to view his or her track results (or the results of a competitor in some implementations) while on the basketball court in real time. In yet another implementation, portable electronic device 24 may be configured similar to or provided as part of a pair of glasses or other eyewear, permitting a player or user to view his or her track results (or the results of a competitor in some implementations) while on the basketball court in real time.

As schematically shown in FIG. 1, in one implementation, portable electronic device 24 comprises data acquisition device 41, output 44, processing unit 48 and memory 52. Data acquisition device 41 comprises a device to obtain at least one attribute of a shot of the basketball towards basket 40, wherein the at least one attribute is sensed by sensor 28 or derived from signal output by sensor 28. In one implementation, data acquisition device 41 obtains raw sensed data directly from signal transmitter 30 of electronics 26 of basketball 22. In another implementation, data acquisition device 41 obtains information derived from raw sensed data from electronics 26. In the example illustrated, data acquisition device 41 cooperate with signal transmitter 30 directly receive attributes of a shot from electronics 26. In another implementation, signal transmitter 30 of electronics 26 may transmit sensed attributes of a shot to an intermediary, such as to a cloud server or other server on a network, wherein data acquisition device 41 obtains at least one attribute of a shot of basketball 22 from the intermediary.

As shown by FIG. 1, in the example illustrated, data acquisition device 41 obtains various attributes of a shot directly or indirectly from electronics 26 of basketball 22. Examples of such attributes of a shot comprise shot launch information such as the launch coordinates LCOOR, launch direction LD and launch angle LA. Launch coordinates refers to the location with respect to basket 40 from which a basketball shot is launched. Launch coordinates includes both the linear distance from a shot launch position to basket 40 and the relative angular positioning (directly in front of basket 40 such as at the free-throw line or at a various angular positions on an arc about basket 40) of the shot launch with respect to basket 40. Although distance D is measured from a center point of rim 44 projected onto the floor court, in other implementations, other endpoints or reference points may be utilized.

The launch coordinates LCOOR is based upon a predetermined or pre-calibrated coordinate system defining the position of basket 40. In one implementation, the coordinate system is established using portable electronic device 24. In another implementation, the coordinate system is pre-established by other electronic devices and retrieved from storage either locally or remotely. In one implementation, portable electronic device 24 provides a person with the option to select which of various modes or methods may be utilized to establish a locational grid or coordinate system for subsequently identifying, using one or more sensors 28 of basketball 22, where a shot is launched from with respect to basket 40. In other implementations, the user may be provided with one or less than all of the below described methods for establishing a coordinate system.

According to one selectable mode of operation, the coordinate system is established by employing a magnetometer (one of sensors 28) in basketball 22. In such an implementation, the user is prompted to calibrate and establish a baseline for an earth compass direction of the basketball goal or basket 40. In particular, the user is provided with an output 44 by processor 48 following instructions in memory 52 or is otherwise instructed to shoot, roll or pass the ball in a direction perpendicular to the goal from a known location, such as the basketball free-throw line. Alternatively, this direction may also be obtained from any other known points on the basketball reference court with proper input values as to where this location is in terms of the basket location. The magnetometer (sensor 28), using the earth compass, determines and utilizes this known line of shot as a reference to establish a coordinate system for later use in identifying launch coordinates for a shot. The coordinate system or the known line of shot is stored in memory 52 or a remote memory such that no further calibration is needed the next shooting session.

According to another selectable mode of operation, the basket coordinate system is established using an RSS timestamp between sensor 28 in basketball 22 and a remote computing device located at a known a predetermined location relative to basket 40 or rim 44. One implementation, the remote computing device may be located at the corner of a basketball court, the free-throw line or other known location. In one implementation, such remote computing devices may comprise a portable electronic device such as a cell phone, a smart phone, a laptop, a tablet, an electronic wristband, a wrist-top computer and the like. Using an RSS timestamp between sensor 28 and computing device, trigonometry is employed to determine the current position of the basketball and to establish a court system for basket 40 and the playing surface. The establish coordinate system is stored for subsequent use to identify launch coordinates.

According to another selectable mode of operation, the basket coordinate system is established using signals from a global positioning system or GPS technology. In particular, signals from a GPS system that was acquired through a GPS sensor (one of sensors 28) within basketball 22 at a known location with respect to basket 40 are used to establish a coordinate system for basket 40 and the playing surface for subsequent use in identifying launch coordinates.

According to another selectable mode of operation, the basket coordinate system is established using a localized positioning system utilizing antennas located on or near the basketball court at one or more known locations with respect to basket 40. During calibration, that antennas communicate with sensors 28 and employ trigonometry to determine the current location of the basketball 22 and establish a coordinate system for hoop or rim 44 and the playing surface for subsequent use in identifying launch coordinates. In one implementation, such antennas may be provided by a portable electronic device such as a cell phone, a smart phone, a laptop, a tablet, an electronic wristband, a wrist-top computer and the like.

According to yet another selectable mode of operation, the basket coordinate system is established using a localized magnetic field in the court and a known location of the basketball 22 utilizing sensor 28 in basketball 22 to determine a current location of the basketball with respect to basket 40 to establish a coordinate system of hoop or rim 44 and the playing surface.

In each of the above described modes of operation where sensors 28 of basketball 22 are used in the establishment of a coordinate system, corresponding sensors of a portable electronic device, such as portable electronic device 24, may alternatively be utilized in place of the sensors 28. For example, in one implementation, instead of locating basketball 22 at a known location with respect to basket 40 and using the above-described RSS timestamp triangulation or the above-described antenna triangulation, corresponding sensors of a portable electronic device may alternatively be located at the known location, wherein the established coordinate system is subsequently transmitted from the portable electronic device to basketball 22, where it is stored for subsequent use when transmitting launch coordinates.

Launch direction LD refers to the horizontal angular direction of a basketball shot. Launch angle LA refers to the inclination or vertical angular direction of the basketball shot.

Such attributes of a shot further comprise flight or motion information of basketball 22. Examples of such attributes comprise acceleration over time A(t), velocity over time V(t), spin axis SA, spin rate SR and the general path of basketball 22 such as its maximum height or peak P. Acceleration over time and velocity over time are determined from signals from accelerometers of sensor 28. Spin axis and spin rate of basketball 22 are driven from signals from one or more gyrometers of sensor 28 which detect the spin S(t) of basketball 22 over time. Each of acceleration over time, velocity over time, spin axis and spin rate are sensed and output as a function of time throughout the life of a shot from launch through a make or miss determination. In other implementations, one or more of acceleration over time, velocity over time, spin axis and spin rate are merely sensed or detected at launch of a shot or at another point in time of a shot, wherein the attributes of the shot at other times during the shot are estimated from the one or more sensed attributes or values. In one implementation, each of such attributes is defined along three coordinates X, Y and Z coordinates.

Such attributes of a shot may further comprise impact information with respect to basketball 22. Examples of such impact information comprise vibration VBB of basketball 22 as it impacts backboard 42 and one or more vibrations VR of basketball 22 as it impacts rim 44. Such impacts may be detected by pressure sensor wherein pressure variations or differential pressure over time can be monitored, or may be detected by signals from accelerometers and/or gyrometers of sensor 28.

Output 44 comprises one or more devices to present information to a person. Such information can be based on the determination of whether a shot is a made basket, or based upon the determination of which of multiple shots are made baskets or missed baskets. In one implementation, output 44 comprises a display screen. In other implementations, output 44 may additionally or alternatively comprise a speaker. In the example illustrated, output 44 is part of portable electronic device 24. In other implementations, output 44 may alternatively be provided on a more stationary computing device, such as a desktop computer or monitor, or may be incorporated into basketball 22.

Processing unit 48 comprises one or more processors configured to carry out operations in accordance with instructions contained in memory 52. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, in some implementations, at least portions of processing unit 48 and memory 52 may be embodied as part of one or more application-specific integrated circuits (ASICs). Unless otherwise specifically noted, operations described as being carried out by processor 48 and memory 52 are not limited to any specific combination of hardware circuitry and software, nor to any particular source for the instructions executed by the processing unit.

Memory 52 comprises a non-transient computer-readable medium or persistent storage device. In the example illustrated, memory 52 stores software, code or computer-readable instructions for directing processor 48 to carry out one or more operations utilizing the one or more attributes of a shot obtained by data acquisition device 41. The instructions in memory 52 further direct processor 48 in the presentation of make/miss results and/or analysis (statistical analysis and recommendations) on output 44. In the example illustrated, memory 52 further stores the results as well as various settings, data tables and thresholds employed in the acquisition of shot attributes, the analysis of shot attributes and the output of results.

Figure 2:
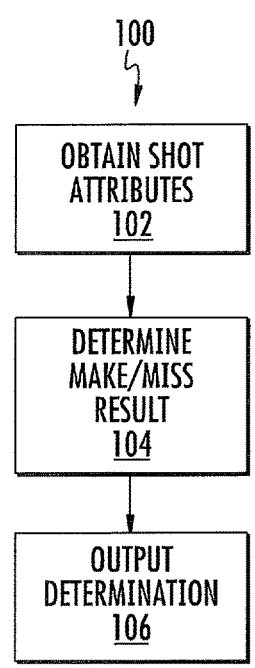
FIG. 2 is a flow diagram of an example method that may be carried out by the basketball sensing system of FIG. 1.

In operation, instructions in memory 52 direct a processing unit 48 to carry out method 100 shown in FIG. 2. As indicated by block or step 102 in FIG. 2, processor 48 obtains one or more attributes of a basketball shot using data acquisition device 41. Such attributes are sensed by sensor 28 or derived from output of sensor 28.

As indicated by block or step 104, processor 48 determines whether a particular shot is a made basket or a missed basket by comparing the at least one attribute of the shot to one or more predetermined signature characteristics of a made basket. Such predetermined signature characteristics are stored in a storage portion of memory 52. In other implementations, processor 48 may acquire such predetermined signature characteristics from a remote source such as a cloud server or other server on a local area network or wide area network (Internet). In one implementation, the predetermined signature characteristics comprise signature characteristics of a made basket. Processor 48 searches through the various signature characteristics of a made basket to determine if the sensed at least one attribute of the shot match or fall within a predefined proximity range of any of the predetermined signature characteristics to qualify as a made basket. In other words, processor 48 determines whether the sensed attributes of a shot have collective characteristics or form a collective pattern of values that sufficiently matches corresponding collective characteristics or corresponding patterns of previously made shots to determine whether the shot being analyzed is a made basket or a missed basket.

In one implementation, processor 48 determines whether a particular shot is a made basket or a missed basket based upon a predetermined portion of a basketball shot. For example, in one implementation, processor 48 determines whether a particular shot is a made basket or a missed basket by looking for shot attributes indicating a particular type of interaction of basketball 22 with net 46. In particular, as basketball 22 fall through net 46, the net 46 may exert resistance R against the gravitational acceleration or falling of basketball 22. This resistance R impacts the acceleration values of ball 22. In response to receiving acceleration values indicating that ball 22 is likely encountering the signature resistance R that occurs only when basketball 22 is falling through net 46, processor 48 may determine whether a particular shot is a made basket are missed basket. Because this determination is made based upon attributes that occur at the end of a shot, after a ball 22 has passed through or is in the process of passing through rim 44, other prior attributes, such as the launch acceleration, launch coordinates, impact with backboard 42 or impact with rim 44 are extraneous and may be disregarded. As a result, processing unit 48 may determine whether a shot is a made basket utilizing fewer shot attributes and shot attributes obtained over a shorter period of time, reducing signal transmission burden of signal transmitter 30. Because the make/miss determination is achieved using less data, processing demands placed upon processor 48 are also reduced.

In other implementations, additional or alternative sensed shot attributes may be utilized by processor 48 to determine whether a particular shot is a made basket or a missed basket. For example, the predetermined signature characteristics of a made basket may indicate that a shot is a made basket if the shot from a particular launch coordinate has a particular set or combination of attributes (either static or over time). For example, a shot from a particular launch coordinate may be deemed a made basket if the shot has, in combination, a particular launch direction, launch angle, and acceleration characteristics. A shot from a particular launch coordinate may be deemed a made basket if the sensed shot attributes indicate a particular shot peak in combination with a particular interaction VBB with backboard 42 and/or a particular interaction VR with rim 44 while basketball 22 has a particular spin rate SR about a particular spin axis SA. In one implementation, the predetermined signature characteristics of a made basket may comprise a table of multiple combinations of different shot attributes/values that equate to a made basket. In another implementation, the predetermined signature characteristics of the made basket may comprise a combination of different ranges for each of different sensed shot attributes that equate to a made basket. The use of multiple sensed shot attributes from different times during a shot may enhance shot determination accuracy of processor 48.

As indicated by step 106 in FIG. 2, processing unit 48 generates signals directing output 44 to present to a person information based on the determination of whether the shot is a made basket. Such information may indicate whether the particular shot is a made basket or missed basket. Such information may comprise an update of historical data. For example, such information may comprise a percentage of shot attempts that result in a made basket. This percentage may be an overall percentage or may be make percentages for each of different locations on the basketball court.

In one implementation, processor 48 may further present information regarding sensed attributes of the shot that resulted in the made basket. For example, processor 48 may provide an output indicating that when a player imparted a certain spin rate or a spin rate within a certain range of spin rates about a particular axis or range of axes, from a particular distance or range of distances, the shot resulted in a made basket x percent of the time. Processor 48 may provide similar output with respect to other attributes such as launch angle and launch direction. By providing such additional information, system 20 provides an indication to the player person as to how he or she may improve his or her shot accuracy, such as increasing or decreasing the spin that the player imparts to basketball 22, adjusting the spin axis and/or adjusting the launch angle and/or imparted force/acceleration to adjust the peak or arc of basketball 22. In some implementations, processor 48 analyzes the make/miss results and the corresponding sensed shot attributes over time to provide the player with specific training or shooting adjustment recommendations on output 44. For example, processor 48 may provide text, graphics or animations on output 44 instructing the player as how to change his or her shooting habits or style to achieve greater shooting accuracy from a particular range.

Figure 3:
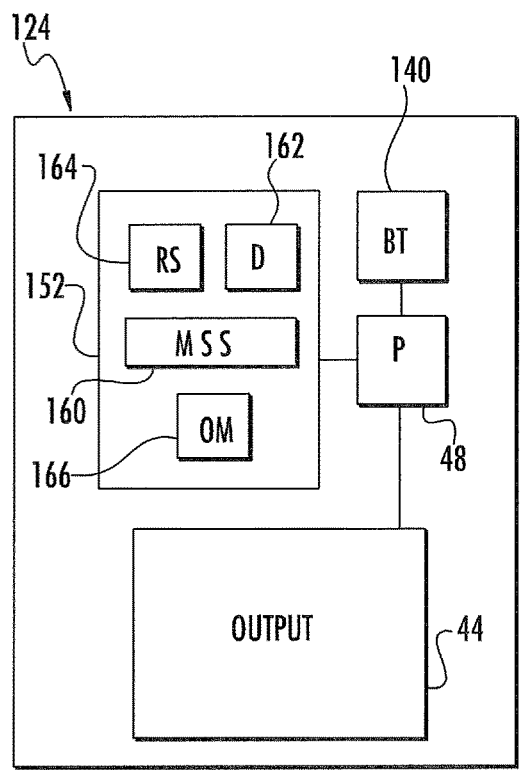
FIG. 3 is a schematic diagram of another implementation of the basketball sensing system of FIG. 1.
Figure 4:
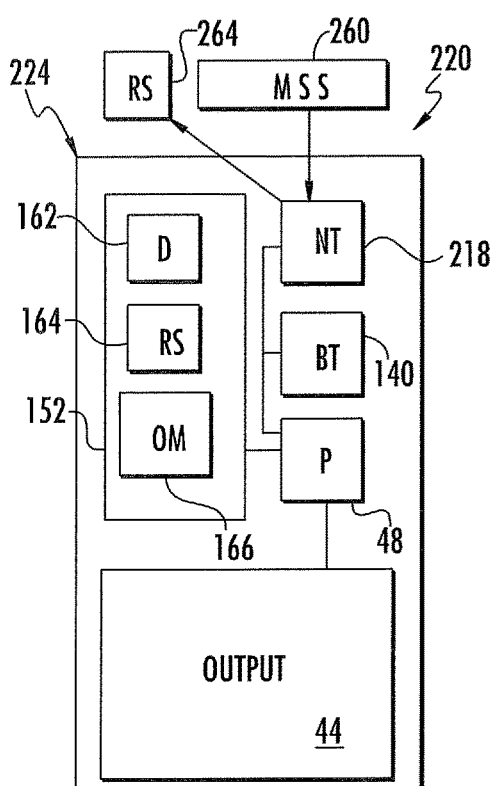
FIG. 4 is a schematic diagram of another implementation of the basketball sensing system of FIG. 1.
Figure 5:
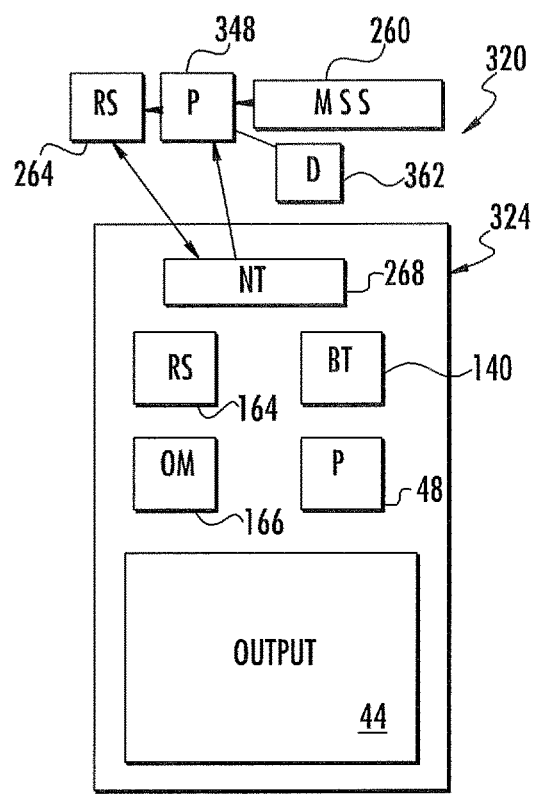
FIG. 5 is a schematic diagram of it another implementation of the basketball sensing system of FIG. 1.

FIGS. 3-5 schematically illustrate other examples of portable electronic device 24 and basketball sensing system 20. FIG. 3 schematically illustrates portable electronic device 124, a specific example of portable electronic device 24 to be used with basketball 22. Portable electronic device 124 is similar to portable electronic device 24 except that portable electronic device 124 is specifically illustrated as comprising ball transceiver 140 in lieu of data acquisition device 41 and memory 152 in lieu of memory 52. Those remaining components of portable electronic device 124 which correspond to components of portable electronic device 24 are numbered similarly.

Ball transceiver 140 comprises a device to receive signals from signal transducer 30 of electronics 26. In one implementation, ball transceiver 140 further transmits signals to ball 22. In one implementation, ball transceiver 140 communicates with signal transmitter 30 of electronics 26 in a wireless fashion such as through radio frequency signals, optical or infrared signals and the like. In one implementation, ball transceiver 140 receives signals from basketball 22 during entire cycle of the basketball shot. In another implementation, ball transceiver 140 receives signals from basketball 22 during selected portions of the cycle of the basketball shot. For example, signal transmitter 30 may be activated and may start transmitting sensed shot attributes in response to sensor 28 sensing a shot attribute having a particular characteristic, triggering the output of shot attributes by signal transmitter 30. In such a manner, battery power of basketball 22 is conserved and processing loads placed upon processor 48 are reduced.

Memory 152 is similar to memory 52, but is specifically illustrated as comprising made shot signatures 160, shot determination module 162, results storage 164 and output module 166. Made shot signatures 160 comprises a storage portion of memory 152 containing predetermined signature characteristics of a made basket. In one implementation, made shot signatures 160 may additionally or alternatively comprise signature characteristics of missed basketball attempts, conversely facilitating the identification of made baskets if signals from a shot do not officially match the signatures of missed basketball attempts. Made shot signatures 160 may be uploaded or imported from a remote source or, in other implementations, may be created using signals from basketball 22 itself. As will be described hereafter, in some implementations, made shot signatures 160 may comprise uploaded or imported signatures created during previous testing with other basketballs and on other basketball courts with other baskets 40, wherein shot signatures 160 are calibrated and adjusted to accommodate unique characteristics of a particular basket 40 and possibly a particular basketball 22 or a particular type, quality or brand of basketball.

Shot determination module 162 comprises that code or software in memory 152 which directs processor 48 in the determination of whether a particular shot is a made basket or a missed basket. Determination module 162 directs processor 48 in the comparison of the at least one sensed attribute of a shot with shot signatures 160.

Results storage 164 comprises a storage portion of memory 152 for storing determinations of whether individual shots are made baskets or missed baskets. Results storage 164 may further store one or more of the at least one attributes associated with those shots that are made (or those shots that are missed) for subsequent shot analysis. Because results storage 164 is locally stored in memory 152, review and analysis of shot results may be achieved without network connection capability.

Output module 166 comprises code or software contained in memory 152 for instructing processor 48 in the output of results on output 44. As noted above, in one implementation, output module 166 directs processor 48 to present updated historical data regarding overall shot percentages, individual shot percentages from different locations on the basketball court or floor and instruction for improving shot accuracy. In other implementations, output module 166 makes different output based upon one or more determinations of whether one or more shots are made baskets.

FIG. 4 schematically illustrates portable electronic device 224, another example implementation of portable electronic device 24. FIG. 4 illustrates portable electronic device 224 use as part of a basketball sensing system 220 which utilizes basketball 22 (shown and described above with respect to system 20) and remote facilitators: made shot signatures 260 and results storage 264. Portable electronic device 224 is similar to portable electronic device 124 except that portable electronic device 224 omits made shot signatures 160 from memory 152 and additionally comprises network transceiver 168. Those remaining components of portable electronic device 224 which correspond to components of portable electronic device 124 are numbered similarly.

Network transceiver 268 comprises a device to communicate across a local area network (LAN) or a wide area network (WAN) such as the Internet. In one implementation, network transceiver 268 facilitates indirect communication with ball 22 via an intermediary, such as an intermediate server or cloud that communicates with both ball 22 and portable electronic device 224. In one implementation, network transceiver 268 further facilitates the acquisition of data from remote data sources by portable electronic device 224 and facilitates the transmission of sensed shot attributes and/or make/miss results to other remote locations across a LAN or WAN. In the example illustrated, network transceiver 268 facilitates remote storage of made shot signatures 260 and make/miss results 264, reducing memory consumption of portable electronic device 224.

Made shot signatures 260 are similar to made shot signatures 160 except that made shot signatures 260 are remotely stored with respect to portable electronic device 224. In one implementation, made shot signatures 260 are remotely stored on a network server or cloud server which is accessible by multiple different users having different portable electronic devices. As a result, made shot signatures 260 facilitate use of a general set of made shot signatures by multiple different users at multiple different locations, wherein the shared made shot signatures 260 may be more frequently and economically adjusted or updated for a large number of users.

In one implementation, made shot signatures 260 may comprise multiple sets, with different sets being dedicated to different basketball court environments. For example, made shot signatures 260 may comprise a first set of signatures for an indoor basketball court and a second set of signatures for an outdoor basketball court. Made shot signatures 260 may comprise a first set of signatures for a leather or synthetic leather basketball and a second set of signatures for a lower cost rubber exterior basketball. Made shot signatures 260 may comprise different sets of signatures for different inflation levels of the basketball being used or for different types of back boards 42, rims 44 or nets 46 being used. In such implementations, the player at a particular basketball court may input inflation level of the basketball, the characteristics of basket 40 or the environment (indoor court, outdoor court, temperature, humidity and/or wind conditions), wherein processor 48 will consult the most appropriate set of made shot signatures based on the user input. In other implementations, basketball 22 may include a sensor to detect an inflation level of the basketball or may include other sensors to detect other environmental attributes, wherein such environmental or inflation factors are transmitted to portable electronic device 224, allowing processing unit 48 to select the most appropriate set of made shot signatures for use in determining whether a shot is a made basket. In some implementations, portable electronic device 224 may itself sense or detect certain environmental conditions (wind, temperature, humidity etc.) or may retrieve such environmental conditions from a remote network source given user input of the basketball court location or a detected location of the basketball court (such as through GPS). In some implementations, network transceiver 224 may be omitted.

Results storage 264 is similar to results storage 164 except the results storage 264 is remote from portable electronic device 224. In one implementation, results storage 264 is accessible through a network connection. As a result, results storage 264 enables other persons, such as coaches are trainers, to access shooting results across a wide area network. In some implementations, access may be provided to organizations offering rewards or incentives for shot performance or improvement or practice frequency. For example, in one implementation, a health insurance provider is provided access to results storage 264, wherein the health insurance provider provides rewards or incentives based upon exercise frequency reflected in the data of results storage 264. In another implementation, other users are also provided with access to results storage 264 across a network, allowing remote competitions or challenges.

FIG. 5 schematically illustrates portable electronic device 324, another example implementation of portable electronic device 24. Portable electronic device 324 is illustrated as being utilizes part of a basketball sensing system 320 which utilizes basketball 22 (described above with respect to system 20) and remote facilitators: made shot signatures 260, results storage 264, processing unit 348 and shot determination module 362. Those components of basketball sensing system 320 which correspond to components of basket sensing system 220 are numbered similarly.

Portable electronic device 324 is similar to portable electronic device 224 except that portable electronic device 324 omits shot determination module 362. Instead, the determination of whether a particular basketball shot is a made basket or a missed basket is made by a remotely located processing unit 348 following instructions provided by remotely located shot determination module 362. Shot determination module 362 is similar to shot determination module 162 except that shot determination module 362 is located remote with respect to portable electronic device 324. In one implementation, shot determination module 362 and the associated processing unit 348 are located on a remotely located network server or cloud server. Because shot determinations are made remote from portable electronic device 324 and merely transmitted to portable electronic device 3244 storage on result storage 164 and for display on output 44, processing demands placed on portable electronic device 324 are reduced. In other implementations, portable electronic device 324 may additionally include shot determination module 162, wherein a user may select whether shot determinations are made locally by portable electronic device 324 (potentially faster response times, but greater consumption of memory and processing power locally on portable electronic device 324) or shot determinations are made remotely by shot determination module 362 and processor 348.

FIG. 6 illustrates made shot signatures 460, one example of made shot signature 160, 260, for use in determining whether a particular basketball shot is a made basket or a missed basket. In the example illustrated, made shot signatures 460 comprises a lookup table of predetermined signature characteristics of a made basket. Made shot signatures 460 comprise a table of shot attributes for each of multiple shots (0-n) which were made baskets. In the example illustrated, for each made shot, signatures 460 lists values for acceleration over time A(t), and shot peak P. In the example illustrated, signature 460 lists raw sensed data for sensed acceleration of basketball 22 in each of the three axes X, Y and Z is a function of time. In other implementations, signatures 460 may identify acceleration over time in other formats or derivations of raw sensed data. The attribute indicating the peak height of basketball 22 during a shot assist in distinguishing a pass from a shot. For example, if the sensed attributes of an expected shot indicate the shot having a peak lower than a height of rim 44, the shot is likely not a shot, but is a pass. In the example illustrated, signatures 460 may omit peak P attribute, wherein the detected or determined peak of a basketball shot is first compared to the height of rim 44 by processor 48, 348 prior to consulting signatures 460. If the detected peak of a pass or shot is greater than the height of rim 44, then further consideration is carried out by processor 48, 348.

According to one example implementation, processor 48, 348, under the direction of determination module 162, 362 compares the acceleration attributes over time (over the entire cycle of the basketball shot or over a particular predefined time period of a shot, such as when the ball is passing through net 46) or the pattern of acceleration values of a particular shot to the signatures 460 to identify whether the particular shot is a made basket or a missed basket. In one implementation, the acceleration values of signatures 460 are taken from when basketball 22 is passing through net 46 (as determined from and triggered by sensed acceleration values indicating when basketball 22 is passing through net 46). Because such attributes indicate whether a basket is a made basket or missed basket independent of other attribute such as launch coordinates LCOOR, signatures 460 may omit such extraneous attributes. In one implementation, the acceleration values are taken during a time period when basketball 22 is passing through net 46, wherein the resistance R of net 46 impacts the acceleration patterns of ball 22. In one implementation, the acceleration values are taken during a time period when basketball 22 is passing through a lower half of net 46, after sideways trajectory of basketball 22 has been absorbed by net 46 and basketball 22 is falling along a more vertical path encountering vertical resistance from a lower, constricted portion of net 46. In one example, if the particular set of acceleration attributes over time does not sufficiently match any of the acceleration values or acceleration patterns Pt0-Ptn, the shot is identified as a missed basket.

As shown by FIG. 6, in addition to identifying a result R: a made basket or a missed basket, signatures 460 may additionally associate the acceleration patterns Pt0-Ptn with a particular type of made shot: a swish shot, a bank shot, a bank plus rim shot or a rim shot. A swish shot is a shot in which the trajectory or path of basketball 22 is not impacted or affected by backboard 42 or rim 44 such as when ball 22 passes within rim 44 without substantially contacting rim 44. A bank shot is a shot in which basketball 22 bounces off of or impacts the front face of backboard 42 prior to passing through net 46. A bank plus rim shot is a shot in which basketball 22 impacts against a front of backboard 42 and further bounces off or against one or more portions of rim 44 part of falling through net 46. A rim shot is a shot in which basketball 22 is not impact backboard 42, but impacts or bounces off of rim 44 one or more times prior to falling through net 46. Other shot combinations are also contemplated, such as, for example, backboard, rim, backboard and in, and rim, rim, rim and in.

Because signatures 460 further specifically indicate the type of made basket for each set of shot attributes, basketball sensing system 20, 220, 320 may further indicate to the player what percentage of his or her shots for a particular location were swish shots, bank shots, bank and rim shots or rim shots. As a result, the player may evaluate not only whether a particular shot was a made basket or missed basket, but evaluate how close the shot was to being a pure shot (a swish) versus a missed shot. A made shot that impacts the backboard 42 or bounces multiple times off of rim 44 prior to falling through net 46 is a less desirable shot as it is closer to being a missed shot (bouncing sideways off the rim rather than through the rim). As a result, even made shots may be improved upon. In one implementation, basketball sensing systems 20, 220, 320 may analyze differences between shot attributes of made swish shots versus made bank or rim shots from a particular location to identify those shot attributes that resulted in a swish shot than a bank or a rim shot. In one implementation, basketball sensing systems 20, 220, 320 may output recommendations or suggestions for improving shot mechanics for made shots.

FIG. 7 illustrates made shot signatures 560, another example implementation of made shot signatures 160, 260 for use in determining whether a particular basketball shot is a made basket or a missed basket. As shown by FIG. 7, in the example illustrated, made shot signatures 560 further facilitates the identification of a type of the made shot, whether it be a swish, bank, bank plus rim or rim shot. In the example illustrated, made shot signatures 560 comprises a lookup table of predetermined signature characteristics of a made basket. Made shot signatures 560 comprises a table of shot attributes for each of multiple shots (0-n) which were made baskets. In the example illustrated, for each made shot, signatures 560 lists values or attributes for acceleration over time A(t), spin axis (spin angle), spin rate, launch direction LD, launch coordinates LCOOR, launch angle, one or more backboard vibrations VBB and one or more rim vibrations VR. In one implementation, each of such attributes is provided for an entire cycle of a shot from launch to the ball completing its passage through net 46. In another implementation, each as such attributes are provided for one or more discrete portions of a shots cycle. In the example illustrated, signature 560 lists raw sensed data of basketball 22 in each of the three axes X, Y and Z as a function of time. In other implementations, signatures 560 may identify such sensed attributes over time in other formats or with derivations of raw sensed data.

In one implementation, made shot signatures 160, 260 further comprise signal traces over time of made basketball shots and missed basketball shots from various locations on the court or with respect to the hoop. To determine whether a shot attempt is a made basket or a missed basket, processor 48, 348, under the direction of determination module 162, 362 compares the traces resulting from the signals received from sensors 28 to the stored traces of signatures 160, 260. By identifying the signature trace that best matches the pattern or trace of signals received during a basketball shot attempt, system 20 determines whether the shot attempt resulted in a made basket or a missed shot.

Figure 7A:
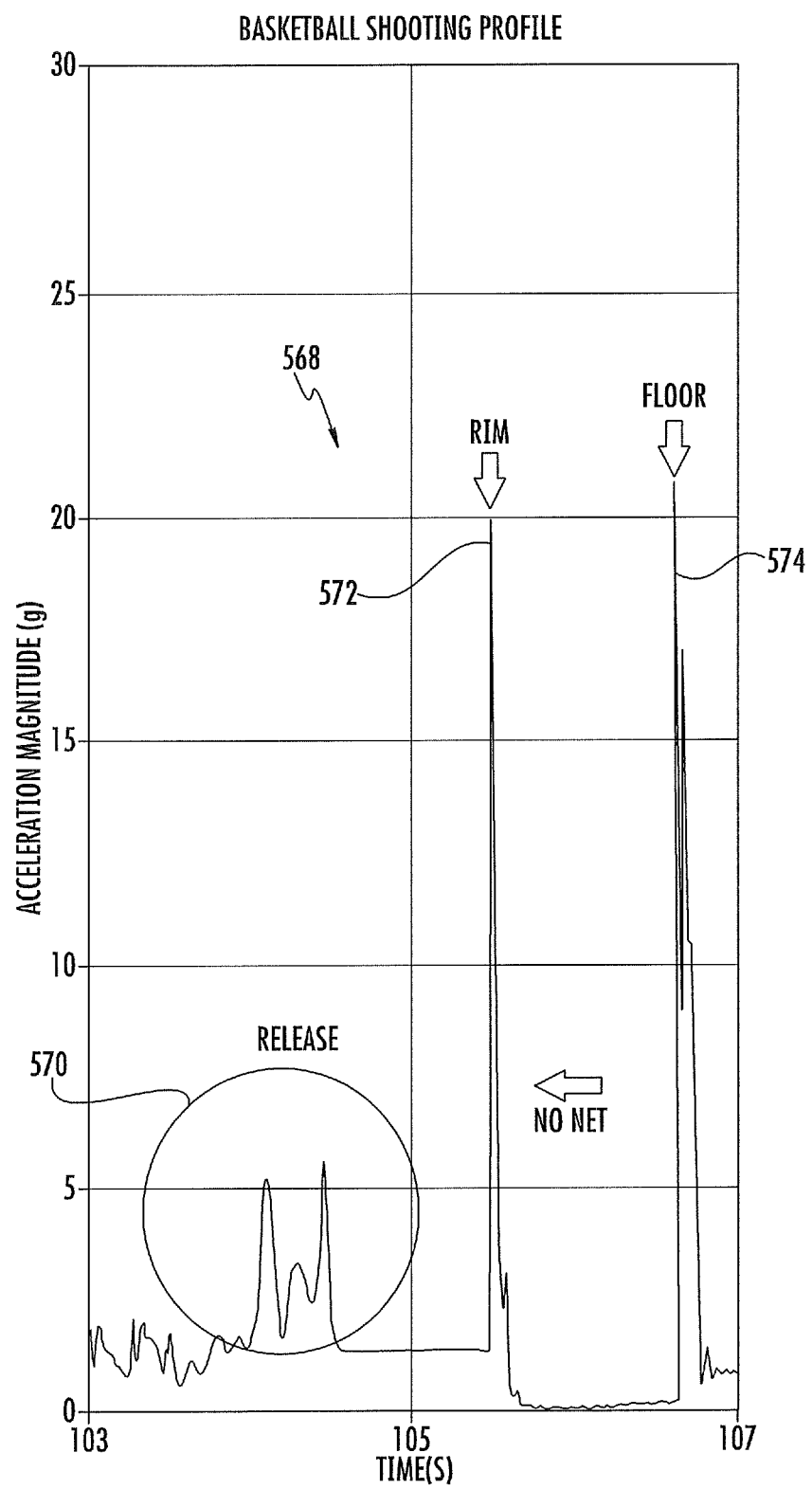
FIG. 7A is a diagram of an example basketball shot acceleration trace signature for a missed shot.

FIG. 7A illustrates an example basketball shot acceleration trace signature 568 of a missed basketball shot generated based upon signals received from basketball 22. In the example illustrated, the initial spikes 570 result from acceleration of the basketball during its release. The spike 572 results from acceleration of the ball impacting the rim 44. The next subsequent spike 574 results from the basketball impacting the floor. Note that spikes 572 and 574 have no intervening spikes which would otherwise result from the ball being caught by the net if the shot attempt was successful.

Figure 7B:
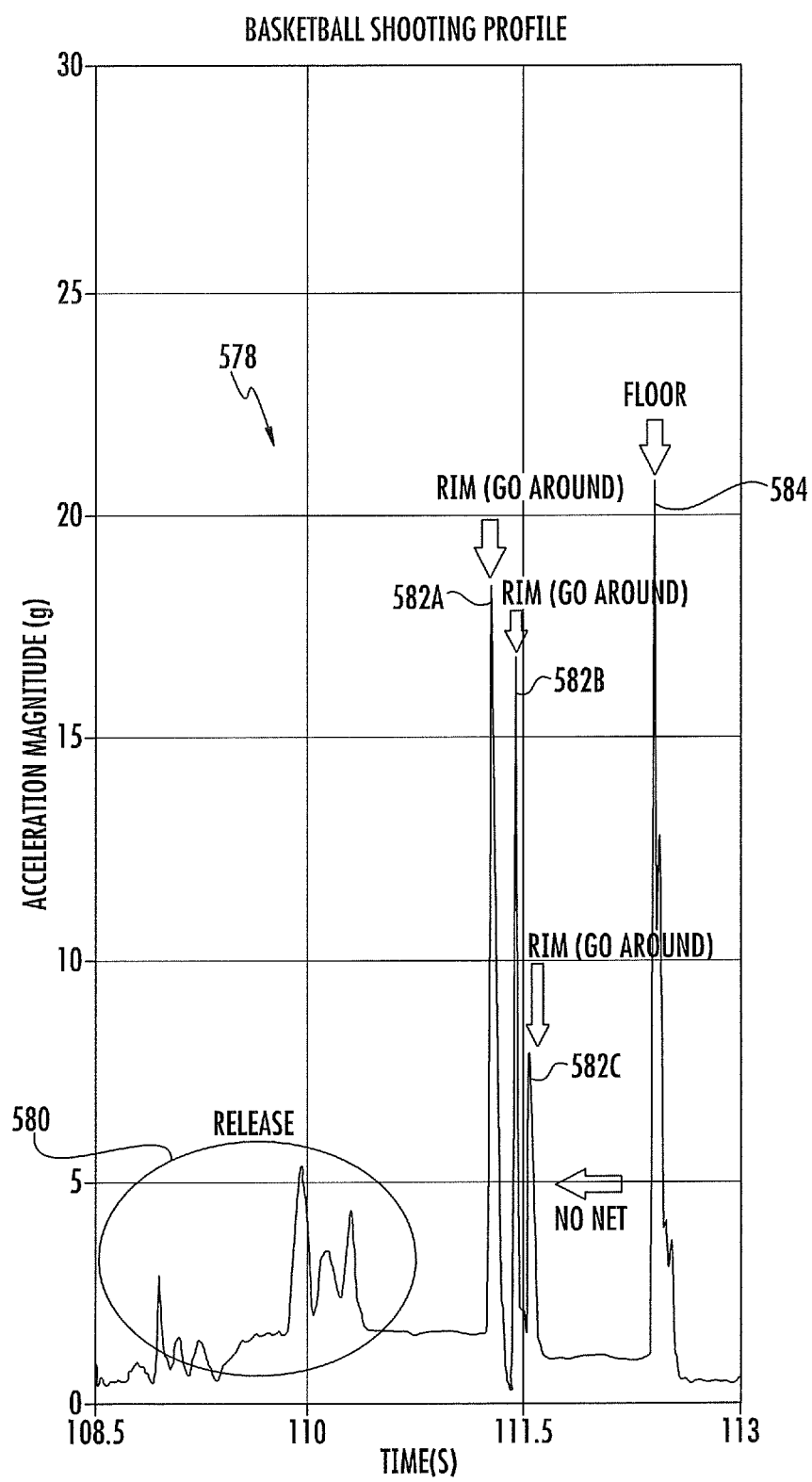
FIG. 7B is a diagram of another example basketball shot acceleration trace signature for a missed shot.

FIG. 7B illustrates an example basketball shot acceleration trace signature 578 of another missed basketball shot generated based upon signals received from basketball 22. In the example illustrated, the initial spikes 580, similar in appearance to spikes 570, correspond to acceleration of the basketball during its release during a shot. Spikes 582A, 582B and 582C correspond to and result from the basketball impacting the rim or going around the rim multiple times. The spike 584 corresponds to and results from the basketball impacting the floor. Once again, note that spikes 582C and 584 have no intervening spike corresponding to the ball being caught by the net if the shot attempt was successful.

Figure 7C:
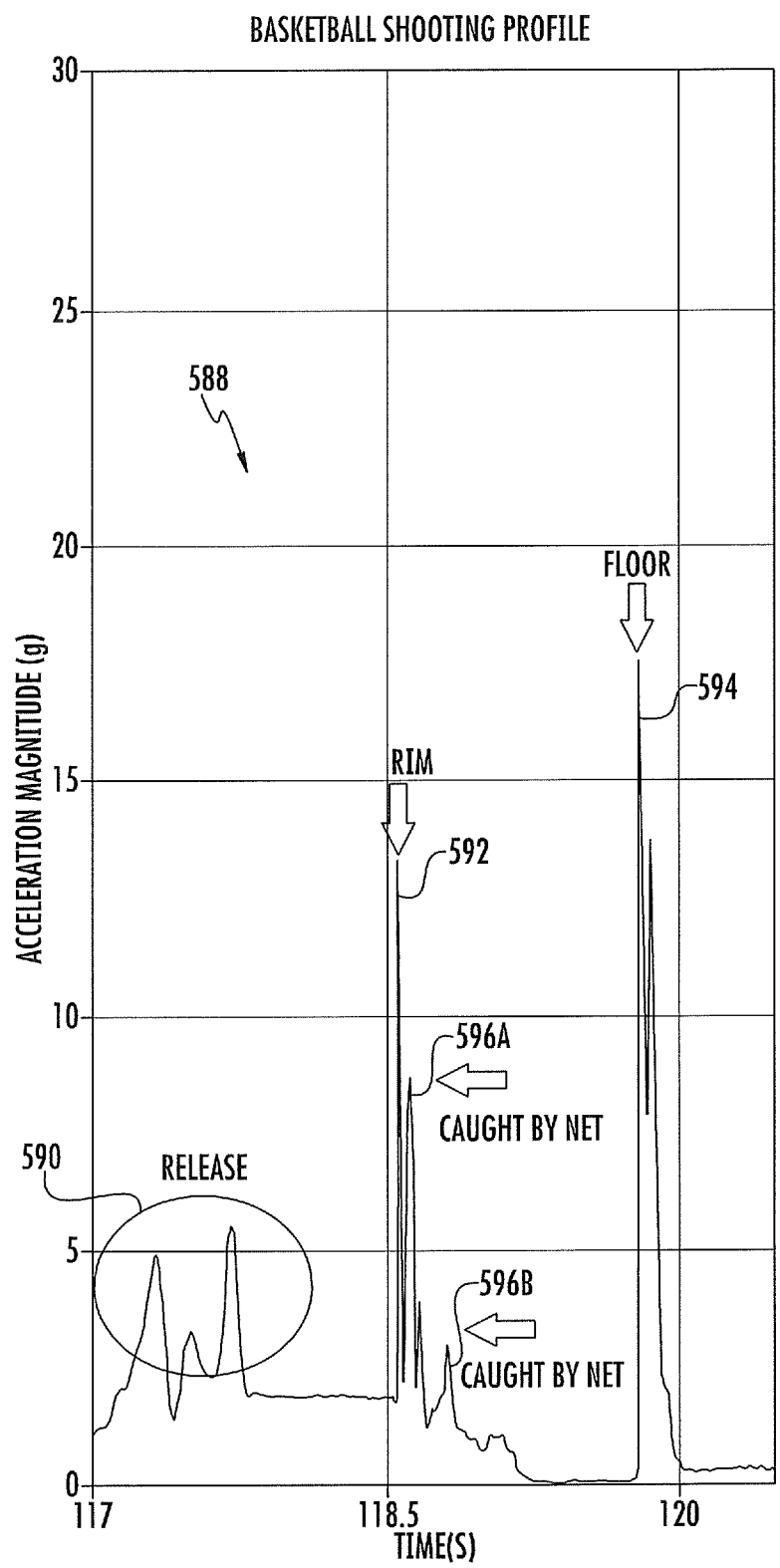
FIG. 7C is a diagram of an example basketball shot acceleration trace signature for a made shot.

FIG. 7C illustrates an example basketball shot acceleration trace signature 588 generated from signals received from basketball 22 during a made basketball shot. In the example illustrated, the initial spikes 590, similar in appearance to spikes 570, correspond to acceleration of the basketball during its release during a shot. Spike 592 corresponds to and results from the basketball impacting the rim. The spike 594 corresponds to or results from the basketball impacting the floor. Intervening spikes 596A, 596B correspond to and result from the basketball being caught by the net, indicating a basketball shot. After each shot attempt, determination module 162, 362 compares the acceleration trace resulting from the shot attempt to basketball shot acceleration trace signatures of shot signatures 160, 260 to find the closest matching acceleration trace and to determine whether the just completed shot attempt was a made basket or a missed basket.

In implementations where the basketball shot acceleration trace signatures, such as those shown in FIG. 7A-7C, include impact of the basketball with the floor (spikes 574, 584 and 594), the user of system 20 is instructed to allow the basketball to hit the floor after each shot attempt. In other implementations, other traces or shot signatures may be utilized which do not require that the basketball be allowed to impact the floor after a shot. In some implementations, determination module 162, 362 may utilize both trace comparisons as well as parameter/attribute comparisons (such as the attribute tables described above with respect to signatures 460, 560) to more accurately determine whether a basketball shot attempt has resulted in a made basketball shot.

In one implementation, processor 48, following instructions contained in memory 52, continuously updates and validates made shot signatures 160, 260, 460, 560 and/or the traces while in use. In effect, processor 48 and instructions in memory 52 form a neural network by which system 20 continually learns and improves upon its make-miss detection accuracy. For example, system 20 is initially provided with a starting or default database of signatures for use in determining whether a shot is a made basket or a missed basket. However, such pre-formulated or standardized signatures for shot attempts, provided by the basketball or application provider, may not take into account unique or particular characteristics of the hoop, the shooting style of the user or the inflation characteristics of the ball. For example, a rim may be "soft" or rigid. A particular net may catch the ball differently producing slightly different signals. The rim in a person's backyard or on a playground may not be exactly at a regulation height or angle. To address such irregularities, in one implementation, after each shot attempt, system 20 outputs an initial determination of whether a shot attempt resulted in a made basket. System 20 further prompts or requests the user to provide feedback regarding the results of the shot through an input device, such as a touchscreen, keypad, keyboard or microphone. Using feedback received from the person shooting the basketball or another person, system 20 confirms the prior determination or corrects the prior determination. As a result, system 20 calibrates and customizes the pre-provided standardized signatures to the unique characteristics of the user's shooting style, the particular characteristics of the hoop being used or other factors.

In one implementation, the user of system 20 may "teach" system 20 and assist system 20 in building a database of make-miss signatures by taking different shots from different locations. During such shots, system 20 senses various attributes of the shot or of the basketball. Following the shot, the user may input to system 20 an indication of whether the shot was a made basket or a missed basket. In some implementations, the user may input to system 20 additional details regarding the shot such as whether the shot impacted the rim and/or impacted the backboard. Utilizing such input information received from the user or from multiple users with respect to multiple shots over time, system 20 compares the received signals from basketball 22 to the feedback from the user to recognize signal patterns, amplitudes or other signal characteristics corresponding to the basketball impacting the rim, the basketball impacting the backboard and the basketball passing through or being caught by the net. As a result, system 20 builds its own database of made and missed shot signatures for subsequent use in determining made shots and miss shots without such user feedback.

In one implementation, the user is prompted or instructed to build such shot signature database by taking multiple shots from various locations and speaking or yelling the results of the shot. For example, the user, just prior shooting the ball, may say "shot" which is received by a microphone and recognize my speech recognition software such that data acquisition device 40 polls or receives information from basketball 22. After completion of the shot, the user is instructed to yell or say either "make" or "miss", wherein such spoken words are captured by the microphone and recognized or discerned by speech recognition software. The received and discerned words "make" or "miss" trigger the processor 48 to identify the end of the shot, to store the signals pertaining to the just completed shot and to identify the shot as either a made shot or a missed shot. In one implementation, the user may additionally verbalize additional details or feedback to system 24 a shot being sensed such as an approximate distance from the hoop, an orientation of the location with respect to the front of the rim, whether the shot was a bank shot, whether the shot was a swish a whether the shot impacted the rim. Such additional details verbalized by the user are further recognized by speech recognition software, recorded/stored in memory and assigned to the sense shot for later analysis and make-miss "learning". Through multiple repetitions, system 20 acquires sufficient data to distinguish between made and miss shots based upon different sense characteristics of a shot basketball 22.

In another implementation, the user can take a shot and the system 24 can indicated on output 44, through an audio message, or through a display projected onto a surface such as a garage door, a backboard, a court surface or a wall, whether the system 24 determined that particular shot to be a made shot or a missed shot. If the user upon recognizing the system's determination recognizes that the determination of the system 24 was incorrect, the user can instruct the system 24 that the opposite result actually occurred on the particular shot. In this manner, the user does not have to provide feedback on every shot to the system 24, but only on those shots where the system's determination was incorrect. The system 24 is configured to allow for such user input to be received and to add the result in the made shot signatures, if appropriate (or a collection of missed shot signatures). In this manner, the accuracy of the system 24 can be efficiently and effectively improved through the collection of sample shots or calibration shots of the ball at a particular location (the user's driveway, local playground, etc.).

In some circumstances, a user may set the rim of the basketball hoop at a lower height than regulation height, such as when the user may lack sufficient strength to shoot a ball to the rim due to the user's size or youth. In one implementation, system 20 may prompt the user to input the height of the rim of the basketball, wherein system 20 downloads, retrieves or utilizes appropriate shot signatures for the particular type of the basketball chosen. In one implementation, the neural network of system 20 facilitates the creation of a custom shot signature database, as described above, that is specifically based upon previously recorded shots and the hoop having the user selected rim height. As a result, system 20 is well-suited for non-regulation hoops or for hoops that are adjusted or customized to accommodate younger or smaller players.

FIG. 8 schematically illustrates basketball sensing system 620, another example implementation of basketball sensing system 20 shown in FIG. 1. Basketball sensing system 620 comprises basketball 22 (shown and described with respect to basketball sensing system 20 and FIG. 1) and portable electronic device 624. In some implementations, basketball sensing system 620 additionally comprises intermediate facilitators: made shot signature 260, result storage 264, remote processing unit 348 and/or shot determination module 362.

Portable electronic device 624 is similar to portable electronic device 124 except that portable electronic device 624 is illustrated as specifically comprising data compressor 629, input 641, network transceiver 268 and memory 652. Those remaining components of portable electronic device 624 which correspond to components of portable electronic device 124, 224 or 324 are numbered similarly.

Data compressor 629 comprises a module to facilitate compression of data for transmission using network transceiver 268. Data compressor 629 may comprise a lossy or lossless data compression device. Data compressor 629 reduces bandwidth requirements for electronic device 624 when communicating sometimes large amounts of shot data (raw, derived or results) across a network. In some implementations, data compressor 629 may be omitted.

Input 641 comprises one or more devices by which a person may enter data and/or selections or commands to portable electronic device 624. It should be understood that each of portable electronic device 124, 224 and 324, in some implementations, likewise include input 641. Examples of input 641 include, but are not limited to, a keyboard, a keypad, a touchpad, a stylus, a microphone and associated speech recognition, a mouse and/or a touchscreen. In some implementations, input 641 may be incorporated as part of a display screen serving as output 44, wherein the display screen is a touch screen. Input 641 facilitates (1) the entry of data, such as data for establishing a basket and court coordinate system, data identifying the player and his or her personal information or data regarding characteristics of basketball 22, and (2) the entry of commands or selections such as the entry of desired settings or options, display formats, thresholds, confirmations and the like.

Network transceiver 268 is described above with respect to portable electronic device 224. Network transceiver 268 facilitates communication across a network, such as a local area network or a wide area network (Internet). As noted above with respect to basketball sensing systems 220 and 320, network transceiver 268 may facilitate remote storage of made shot signatures 260, results 264 and/or the determination of whether a shot is a made shot or miss shot using a remote processing unit 348 in conjunction with a remote determination module 362. In some implementations, network transceiver 268 may be omitted.

Memory 652 comprises a non-transient computer-readable medium containing code configured to direct the processing unit 48 to carry out one or more operations in the sensing of basketball shots. FIG. 9 illustrates memory 652 in more detail. As shown by FIG. 9, memory 652 comprises determination module 162, result storage 164 and output module 166 described above. Memory 652 further comprises made shot signatures 660, wherein made shot signatures 660 comprises made shot signatures 460, made shot signatures 560 or variations thereof. As shown by FIG. 9, memory 652 further comprises communication module 670, coordinate module 672, coordinate storage 674, calibration module 675, comparison module 676 and comparison storage 678.

Communication module 670 comprises software code or programming that provide direct communication between portable electronic device 624 and basketball 22 and/or a remote intermediary such as made shot signatures 260, result storage 264 and/or processing unit 348 and the associated determination module 362 across a network using one or more servers. Communication module 670 directs processor 48 to utilize network transceiver 268 to acquire any updates of made shot signatures from made shot signature storage 260, wherein made shot signatures 660 are provided with updated values. Communication module 670 further directs ball transceiver 140 to obtain or acquire sensed shot attributes from basketball 22, cooperating with signal transmitter 30.

Coordinate module 672 comprises software or code for directing processing unit 48 in the establishment of a basket coordinate system or grid layout. Coordinate module 672 directs processor 48 to provide instructions for establishing such a coordinate system using one or more prompts presented on output 44. Coordinate module 672 further instructs processor 48 to generate control signals which are transmitted to ball 22 through ball transceiver 142 of ball 22 in the establishment of the basket coordinate system. For example, coordinate module 672 may direct processor 48 to transmit control signals to basketball 22 to instruct basketball 22 in the RSS timestamp or other triangulation to establish a basket coordinate system. As noted above, in some implementations, coordinate module 672 may instead utilize sensors of portable electronic device 624 that correspond to sensors in basketball 22 when determining the basket coordination system, wherein the determined basket coordination system is transmitted to basketball 22 for subsequent use when transmitting launch coordinates. The determined basket coordinates are stored in coordinate storage 674.

Calibration module 675 comprises software or code for directing processor 48 in the calibration of basketball sensing system 620 based upon specific characteristics of the specific basketball being utilized, the specific backboard 42 characteristics, the specific characteristics of rim 44 and the specific characteristics of net 46. In one implementation, calibration module 675 adjusts settings or values in made shot signatures 660 based upon sensed shot attributes received during made (or missed) calibration shots. In another implementation, calibration module 675 generates or creates at least portions of made shot signatures 660 based upon sensed shot attributes received during made (or missed) calibration shots.

FIG. 10 is a flow diagram of an example calibration method 700 that may be carried out by basketball sensing system 620 following instructions provided by calibration module 675. As indicated by block or step 702, calibration module 675 directs processor 48 to present one or more prompts on output 44 for a basketball shot. In one implementation, the prompt requests of a specific type of basket such as one of a swish, a bank, a bank and rim or a rim shot. In other implementations, the type of shot may be random and later entered after the shot is made. As indicated by step 704, calibration module 675 directs processor 48 to obtain sensed shot attributes from basketball 22 using ball transducer 140. Such sensed shot attributes are stored in memory 652 for analysis.

As indicated by step 706, calibration module 675 directs processor 48 to present a prompt confirming that the calibration shot was a made shot or made basket. As indicated by step 708, calibration module 675 directs processor 48 to present a prompt confirming the type of shot: swish, a bank, a bank and rim or a rim shot. For example, even if a person is requested to make a bank calibration shot, the actual shot may turn out to be a rim shot or a swish, wherein the user would enter, using input 641, the actual type of the made shot and wherein the actual type of the shot would be associated with the sensed shot attributes.

As indicated by step 710, based upon one or more such calibration shots, calibration module 675 either generates made shot patterns or signatures which are added to made shot storage 660 or adjusts such values in made shot storage 660. Calibration module 675 enhances accuracy by generating or adjusting made shot signatures based upon actual environmental, basketball or court conditions. For example, the particular basketball being employed may be underinflated or overinflated, impacting made shot signatures they utilize values for vibrations of the basketball off of the backboard 42 or the rim 44. The backboard 42 and/or rim 44 may have different stiffness values, surface roughnesses, resiliencies. By way of another example, the particular net 46 of the particular court may be stretched, may be brand-new and more constrictive, or may comprise a chain rather than a cloth net. In such circumstances, calibration module 675 adjusts the values of made shot signatures 660 which utilize such basketball and net interaction attributes (as described above with respect to the resistance exerted upon the following basketball 22 as a basketball 22 passes through the lower half of net 46), either alone or with other shot attributes. Still further, the court or playing surface can vary from wood, concrete, asphalt, tiled, etc. resulting in different characteristics upon impacting the ground after a shot.

Comparison module 676 comprises software code in memory 652 which directs processing unit 48 to compare results of one or more basketball shots with corresponding results of other players, with previously recorded results by the same person or player or with personal shooting goals of the person. In one implementation, the results of other players or the personal shooting goals of the person which are used for comparison are stored in comparison storage 678. In one implementation, the results of other players or personal shooting goals of the person may be retrieved from a remote storage sites such as from the other player's portable electronic device or a generally accessible intermediary such as a Web server. Once the comparison is made, comparison module 676 directs processor 48 to present the comparison results on output 44. As a result, comparison module 676 facilitates challenges and competitions amongst different players as well as feedback and motivation for achieving one's personal goals.

In one implementation, comparison storage 678 stores shooting results for elite or celebrity basketball players. For purposes of this disclosure, a "celebrity" shall mean a person who has attained notoriety or an elite status for his or her performance in the sport. Examples of such celebrities include college and professional basketball players. Although comparison module 676 may utilize comparison storage 678 serving as a celebrity storage for storing user data pertaining to travel of the ball, in other implementations, comparison module 676 may obtain shooting results or results from a remote location using network transceiver 268. For example, celebrity ball travel results or characteristics may be alternatively provided at a remote server which may be accessed across a local or wide area network.

Based upon signals received from sensor 28, comparison module 676 directs processor 48 to compare a person's results with that of a celebrity and to output and/or store the comparison results.

In some implementations, comparison module 676 may additionally provide comparisons of one or more selected shot attributes. For example, in one implementation, comparison module 676 may not only compare the percentage of shots made from a particular distance or from a particular location on the basketball court (i.e., Three-point range from a side of the basket), but may also compare shot attributes such as statistics regarding the height or arc of such shots, statistics regarding the amount of backspin placed on the ball by players during such shots, statistics regarding the launch angle of shots, statistics regarding the distribution of made shots between those that are swish shots, those that a bank shots and those that impact the rim prior to being made. In implementations where the comparison is made with respect to a celebrity basketball player, the user of basketball sensing system 620 may discover that a particular professional or college basketball player may have a better shot percentage due to the celebrity player having a greater arc or applying backspin within a particular range. The comparison results are also stored in comparison storage 678 for subsequent retrieval for subsequent comparisons.

FIGS. 11-16 illustrate portable electronic device 824, an example implementation of portable electronic device 624 as employed in a basketball sensing system 820 which further comprises one or more basketballs 22. Portable electronic device 824 comprises processor 48, ball transceiver 140, network transceiver 268, data compression device 629, input 641, and memory 652 (illustrated and described above with respect to portable electronic device 620). In the example illustrated, portable electronic device 824 comprises a single transceiver which serves as both ball transceiver 140 and network transceiver 268. In other implementations, portable electronic device 824 may comprise separate transceivers for communicating with ball 22 and a network.

Figure 11:
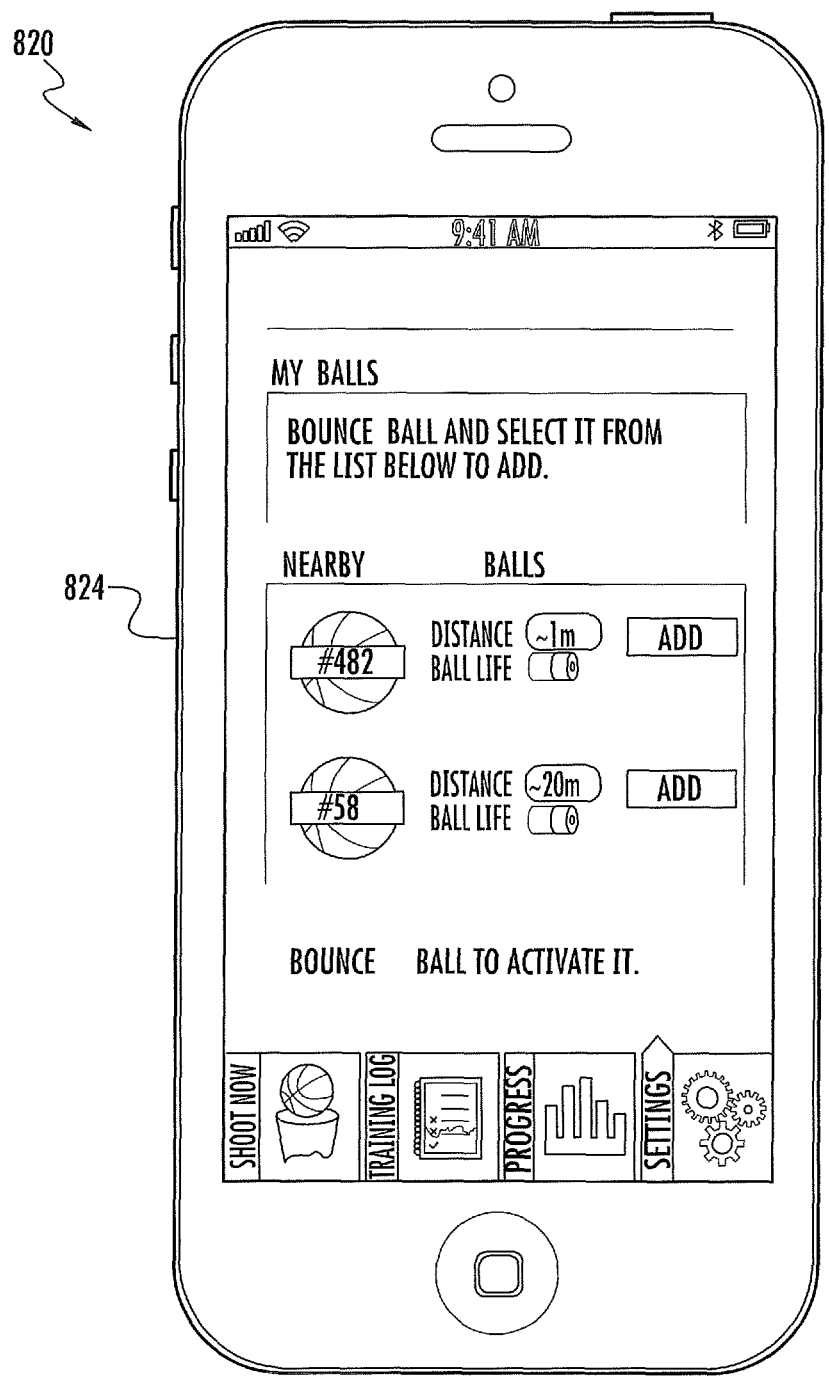
FIG. 11 is a front view of an example portable electronic device of the system of FIG. 1 presenting a first display screen.

As shown by FIG. 11, communication module 670 of memory 652 (shown in FIG. 9) directs processor 48 to identify nearby basketballs 22 configured to communicate with portable electronic device 824 using ball transceiver 140. The identified basketballs are then presented on output 44 and provided with unique identifications (#482 & #58) in the example shown. The status for the identified balls is further presented on output 44. In the example illustrated, the distance of each of the identified balls from portable electronic device 824 is indicated and the current sensed power level or battery charge of each of the identified balls is presented on output 44. In one implementation, processor 48 transmits status request signals to ball 22 through ball transducer 140, wherein each of the basketballs 22 answers inquiries with information such as the charge or "ball life" remaining.

Figure 12:
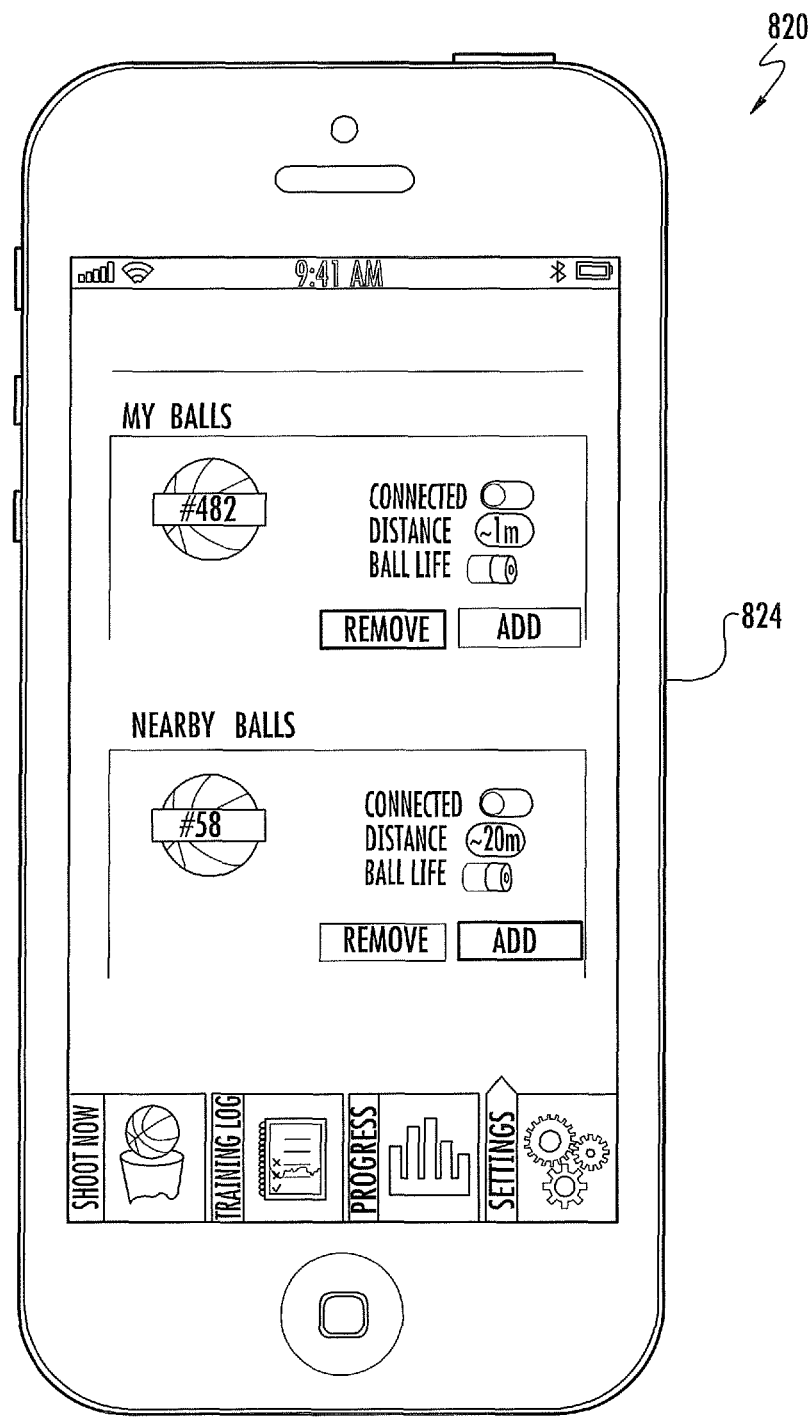
FIG. 12 is a front view of the portable electronic device of FIG. 11 presenting a second display screen.

As shown by FIG. 12, in response to receiving input through input 641 (the touch screen provided by output 44) requesting that the identified ball be "added", communication module 670 directs processor 48 to indicate that the selected basketball 22 is "connected" such that signals representing sensed shot attributes will be transmitted by the particular basketball 22 and received by portable electronic device 824 of basketball sensing system 820. More than one of the identified balls may be connected to portable electronic device 824 and employed as part of basketball sensing system 820, allowing a player to shoot multiple shots with multiple balls at a higher frequency for enhanced practice efficiency.

Figure 13:
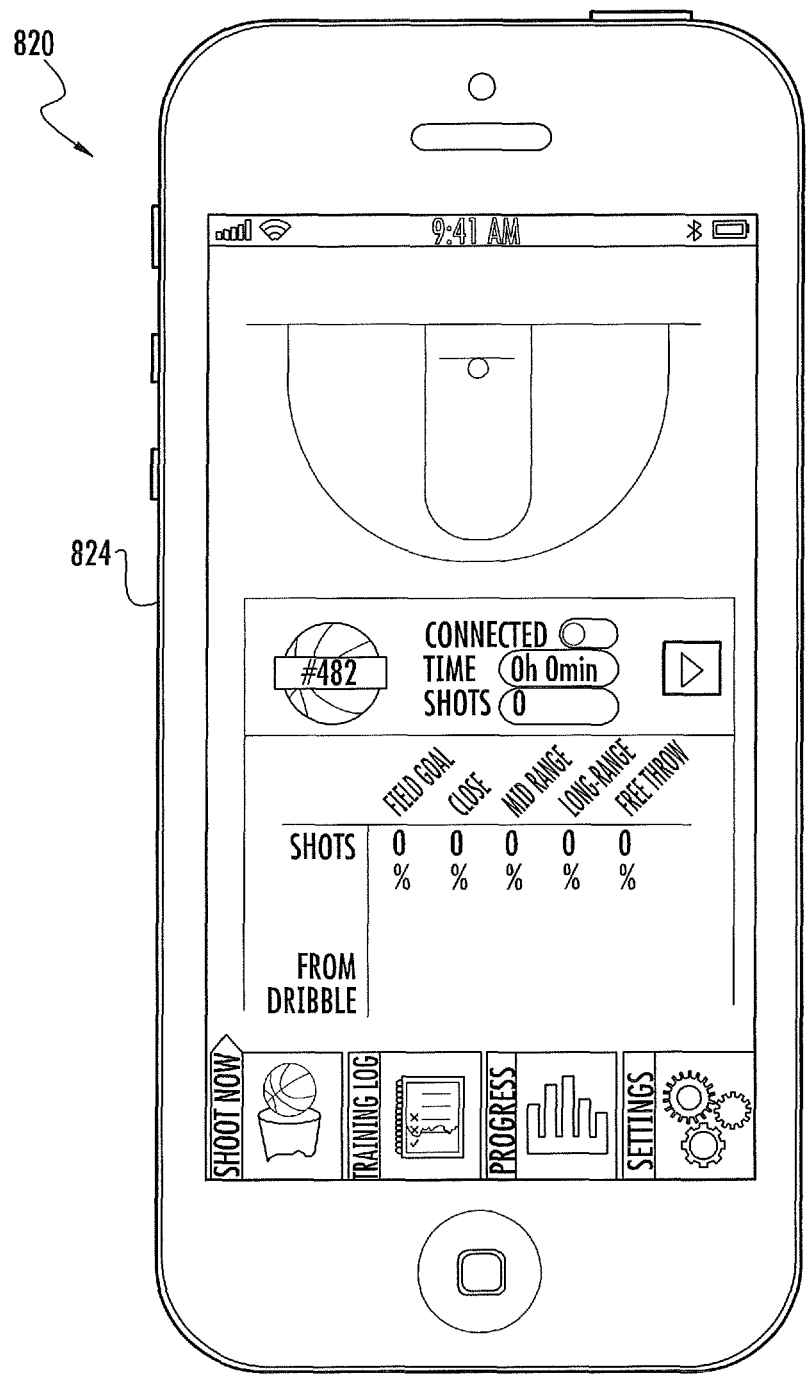
FIG. 13 is a front view of the portable electronic device of FIG. 11 presenting a third display screen.
Figure 14:
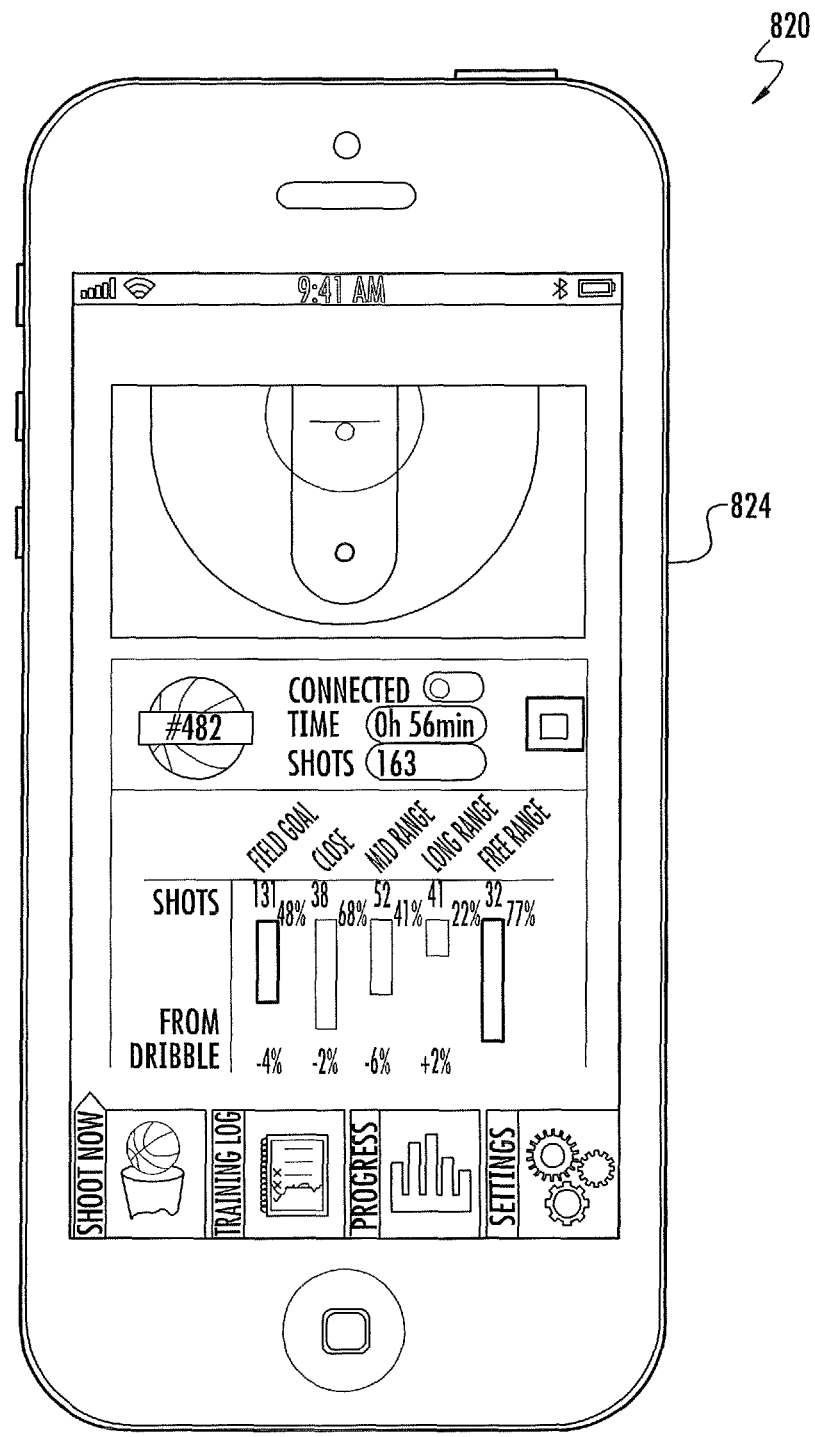
FIG. 14 is a front view of the portable electronic device of FIG. 11 presenting a fourth display screen.

As shown by FIGS. 13 and 14, upon one or more of basketballs 22 being connected to or synced with portable electronic device 824 and in response to an input indicating that shooting is to start ("SHOOT NOW"), shot determination module 162 begin sensing shot attributes received from the one or more balls 22 using ball transducer 140. In the example illustrated, output module 166 depicts a representation of the basketball court on output 44, the identification of the connected basketballs 22 and the current location of the basketballs, including the basketball 22 about to be shot. In the example illustrated, output module 166 further displays an elapsed time (using an internal timer or time of portable electronic device 824) since the beginning of shooting. In one implementation, output module 166 may present a countdown from a predetermined time.

Shot determination module 162 directs processor 48 to identify the beginning and completion of each shot using the sensed shot attributes and to compare one or more of the sensed shot attributes from each shot with made shot signatures 660. Based upon this comparison, processor 48 identifies or determines whether the individual shot is a made basket and stores the result in result storage 164. As shown by FIGS. 13 and 14, the tracked results for those shots during the particular session are presented on output 44 by processor 48 following instructions provided by output module 166 on output 44. In the example illustrated, output module 166 provides an indication of the total number of shots that were attempted by (163) along with a further breakdown of the number of shots taken as field-goal shots (131) and the number of shots attempted as free throws (32). For those shots that are field-goal attempts, output module 166 further presents a breakdown of information indicating the number of attempts made from various distances (close, midrange, long-range). For each category, upper module 166 indicates the percentage of made shots. In the example illustrated, output module 166 provides a bar graph along with and alphanumeric indication of the shooting percentage. In one implementation, output module 166 may provide each of the bars with a distinct color, brightness or frequency providing other indications such as whether or not the current shooting percentage is satisfying the players personal shooting goals, whether the current shooting percentage is an improvement over prior results from prior shooting sessions or based upon a comparison of the shooting results with a shooting result of a celebrity basketball player.

In the particular example illustrated, determination module 162 further directs processing unit 48 to analyze signals received from basketball 22 prior to launch of the particular basketball shot to determine whether the basketball shot was "from dribble". For example, by sensing signals produced by the one or more accelerometers of sensors 28, processor 48 may determine if the ball was dribbled prior to launching of the particular basketball shot. As shown by FIG. 14, the determination of whether the shot was dribbled prior to a shot is stored in results storage 164 and is presented on output 44 by output module 166. In the example illustrated, output module 166 provides an indication of whether the shot performance or shot accuracy improved or worsened following dribbling of basketball 22. In the example illustrated, output module 166 provides a shooting percentage increase or decrease that occurred when basketball 22 was dribbled prior to the launch of a shot versus when basketball 22 is not dribbled prior to the launch of a shot. As noted above, depending upon the selected settings or modes of operation for basketball sensing system 820 and portable electronic device 824, output module 166 may present additional or alternative information on output 44, examples including, but not limited to, the percentage of time or distribution for each type of shot (swish, bank, rim, bank and rim), statistics regarding the spin applied to basketball 22 overall or for each shot category or distance category, statistics regarding the arc (maximum peak P) applied to basketball 22 overall or for each shot category or distance category, launch angle of the basketball for each shot category or distance category.

Figure 15:
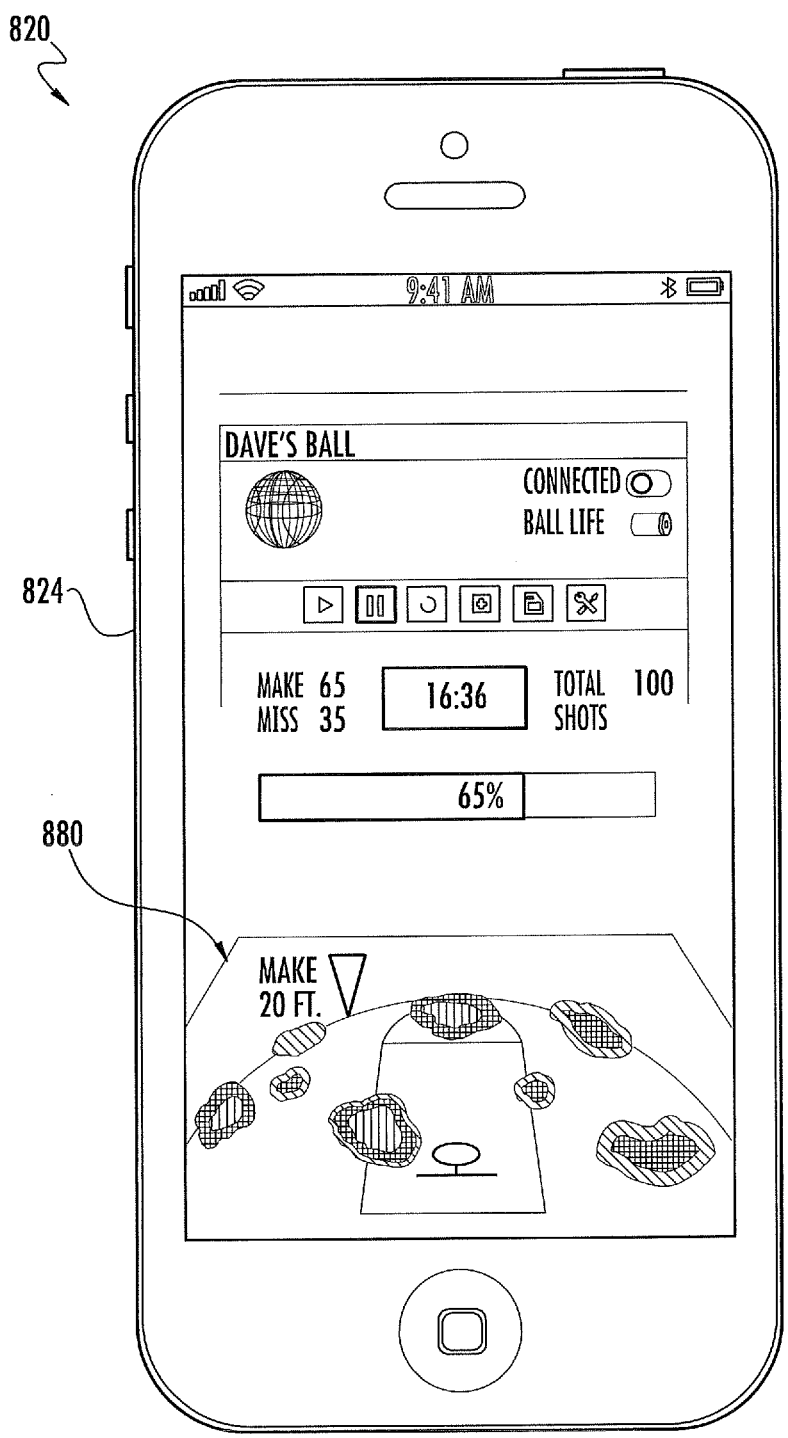
FIG. 15 is a front view of the portable electronic device of FIG. 11 presenting a fifth display screen.

FIG. 15 illustrates an additional output screen or output mode of basketball sensing system 820. In the example illustrated, output module 166 directs processor 48 to present a graphical representation on output 44 of at least a portion of a basketball court and an indication of shooting percentages at and from different locations on the depicted basketball court. In the example illustrated, the indications form a heat map 880 (a shot map or shot mapping), wherein the shooting percentage at different locations on the court is indicated by different heat intensity colors. In the example illustrated, those regions that have a greater or higher shooting percentage had a more intense heat indication (red versus yellow or green). As a result, a player may visually see what locations of the court he or she has a greater shooting accuracy versus those other areas of the court from which a basket is less likely to be made or for which improvement is needed. In other implementations, other indications of shooting percentages or other sensed shot attributes may be provided at different locations on the depicted basketball court. For example, alphanumeric symbols may be provided at different locations on the depicted basketball court, where the alphanumeric symbols indicate one or more of the number of shots attempted, the number of shots made, the percentage of shots made, the percentage of shots missed, the average backspin applied to a shot, the average or range of shooting height or arc of shots from a particular distance and the like. In other implementations, colors or different symbols or graphics may be used at different locations of the depicted court to indicate different shot attributes or shot results.

In the example illustrated, output module 166 records how shot percentages from different locations on the court change over time during a practice or shooting session. As shown by FIG. 15, a person may input a pause button, a play button or rewind button when viewing the changing animation of the shot percentages from different locations of the court. In such a manner, a player may visually determine how his or her shooting percentages changed over time during a practice session, indicating that a person's shooting performance may have improved during the practice session due to a change in shooting mechanics or focus or indicating that a person shooting performance may have declined due to a change in shooting mechanics, a change in focus or fatigue. Or, if outside, a change in ambient temperature, atmospheric pressure, wind, amount of daylight, etc. may affect the performance of the player over time. In the example illustrated, output module 166 further presents an indication of the total number of shots taken, an indication of number of shots made, an indication the number of shots missed and an indication of the overall shooting percentage. In the example illustrated, and animated bar graph is presented indicating overall shooting percentage, wherein the bar graph has a bar that extends and retracts based upon the ever-changing shooting percentage during the shooting session.

Figure 16:
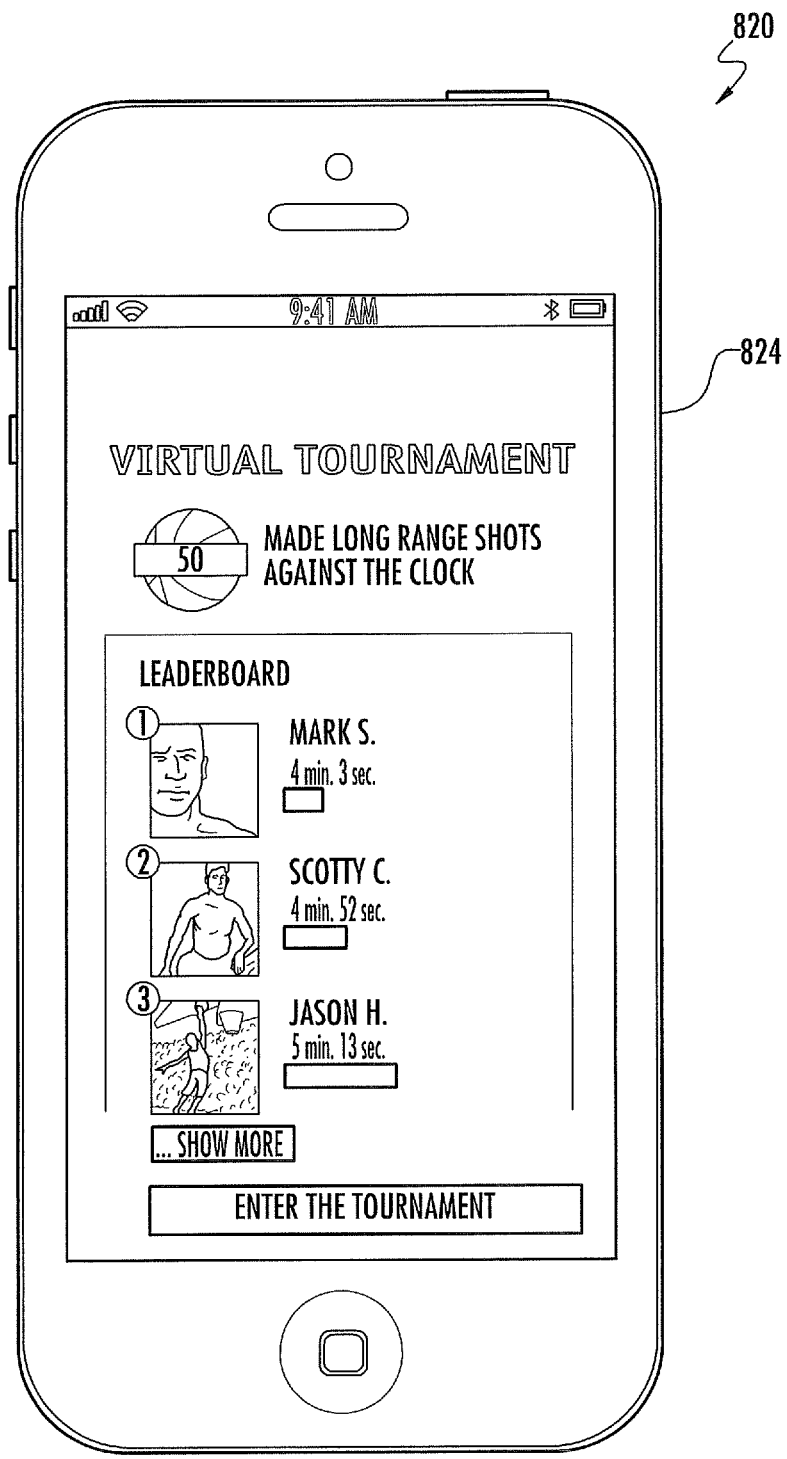
FIG. 16 is a front view of the portable electronic device of FIG. 11 presenting a sixth display screen.

FIG. 16 illustrates basketball sensing system 820 in one mode of operation where a player may enter a competition (a virtual tournament) with other players or participants. In the example illustrated, comparison module 676 directs processing unit 48 to obtain shooting results from other participates in the challenge or competition. In one implementation, the other participant shooting results may be obtained directly from the portable electronic devices of the other participants. In another implementation or according to another mode, the other participant shooting results may be obtained through an intermediary such as from a Web server, cloud server or the like. For example, the other participants' results may be retrieved from a host server that is hosting the Challenger tournament or from the other participants' personal social webpage (i.e, FACEBOOK page). Upon retrieving such information, output module 166 presents the other participant shooting results for comparison. In the example illustrated, the challenge is to score 50 long-range shots (beyond the three-point arc) in the shortest amount of time. In other implementations, various other challenges or competitions may be facilitated by basketball sensing system 820. For example, shooting games of "horse" or "pig" may be carried out in a virtual manner by participants at different locations on different basketball courts.

Figure 17:
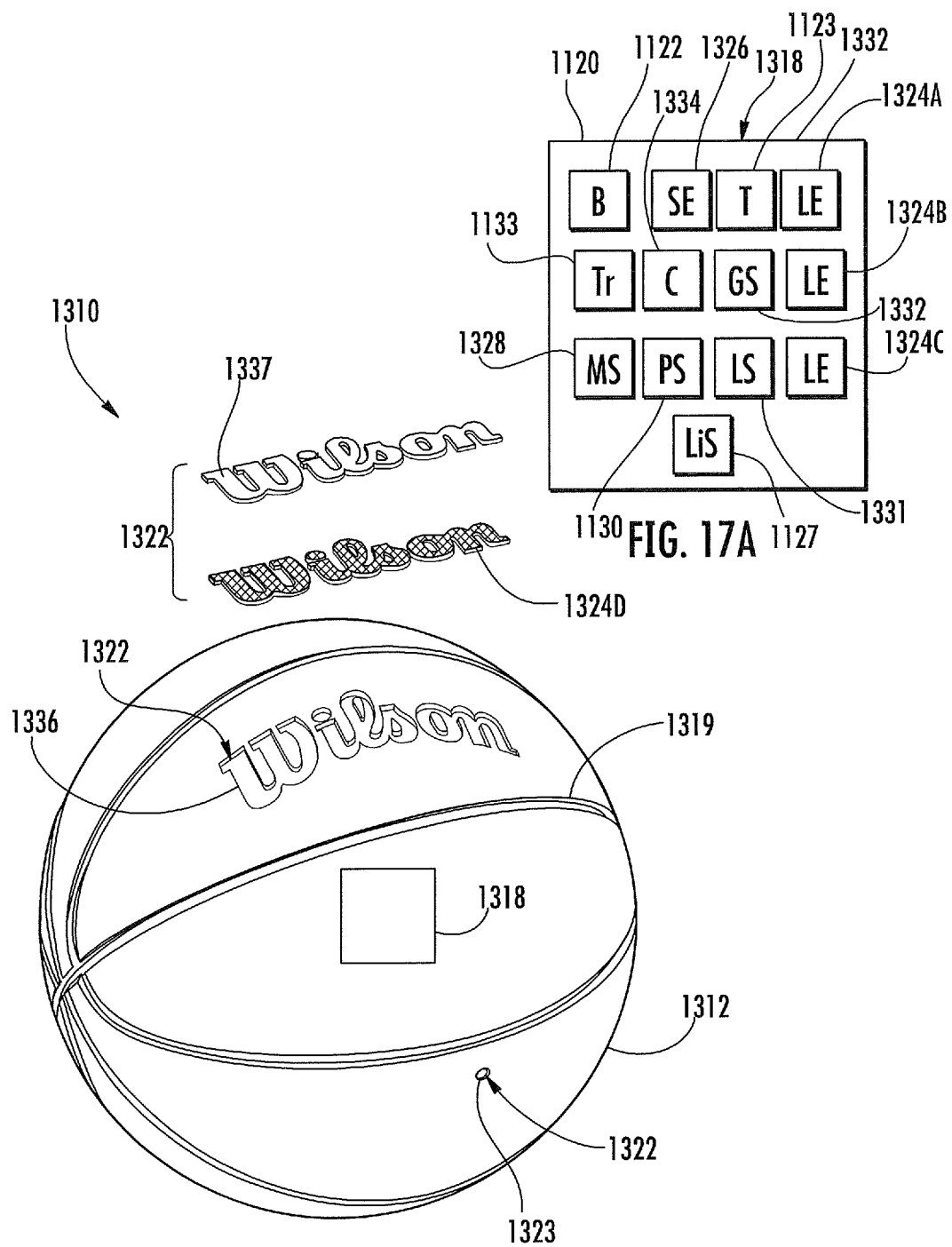
FIG. 17 is an exploded perspective view of an example basketball.
Figure 18:
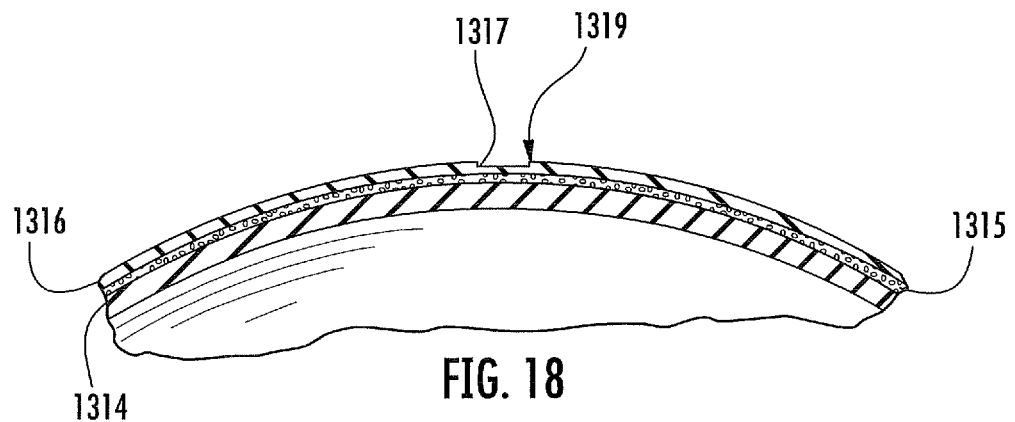
FIG. 18 is a fragmentary sectional view of a portion of an example basketball of the system of FIG. 1.

FIG. 17 illustrates basketball 1310, another example of basketball 22. The basketball 1310 is a generally spheroidal shaped inflatable object. The basketball 1310 is configured to be grasped, dribbled, passed and shot by a player during use. As shown by FIG. 18, basketball 1310 comprises bladder 1314 (FIG. 18), windings 1315, cover 1316, and electronics 1318 (FIG. 17). In some embodiments, the basketball 1310 can also include one or more logos 1322.

Bladder 1314 comprises an inflatable sphere formed from materials such as butyl rubber, natural rubber, a combination of butyl and natural rubber and other elastic materials. In one implementation, bladder 1314 is made from 80% butyl rubber and 20% natural rubber. As will be described hereafter, in some implementations, some portions of bladder 1314 or windows formed in bladder 1314 may be formed from one or more transparent or translucent materials. The bladder 1314 can be formed of a single layer or can be formed of two or more layers.

Windings 1315 comprise a layer of wound reinforcing thread wound about or over bladder 1314. In one implementation, prior to the application of cover 1316, the reinforcing thread may be further coded or covered with a viscous material, such as a latex or adhesive. In one implementation, the reinforcing thread is passed through a viscous adhesive material prior to being wound about bladder 1314. In one implementation, the thread forming windings 1315 comprises nylon 66. In other implementations, the thread are material forming windings 1315 may comprise other materials. As will be described hereafter, in some implementations, at least portions of the layer of windings 1315 are translucent or transparent. In one implementation, the windings 1315 can be replaced with a layer of woven or unwoven fabric patches that are placed about the bladder and attached to each other by an adhesive.

Cover 1316 comprises a layer of elastic material over and about windings 1315. In one implementation, cover 1316 comprises a natural rubber, a butyl rubber, a sponge rubber or a combination thereof as described in U.S. Pat. No. 5,681,233. In one implementation, cover 1316 is formed by laying panels or sheets of material over windings 1315 and by molding or fusing the panels into a continuous integral unitary homogenous layer over windings 1315. In another implementation, cover 1316 formed by injection molding or other fabrication techniques. As shown by FIG. 18, in one implementation, during the formation of cover 1316 by molding or melting, the exterior surface of cover 1316 is molded are shaped to include valleys 1317 defined by inner edges of cover 1316. In one implementation in which cover 1316 also serves as the exterior surface of basketball 1310, the valleys 1317 forming cover 316 provide grooves 319 (shown in FIG. 17) on the exterior of basketball 310 to facilitate gripping. In such an implementation where cover 1316 serves as the exterior surface basketball 310, the exterior service of cover 1316 may additionally have molded thereon outwardly projecting pebbles between valleys 1317 and logo 1322. In FIG. 18, the ball can also be referred to as a carcass, and the cover 1316 can be the outer surface of the carcass.

Figure 19:
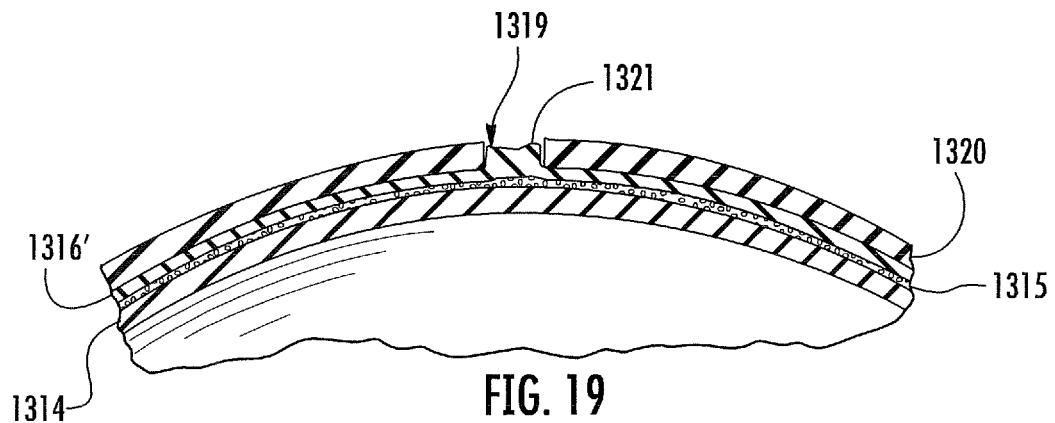
FIG. 19 is a fragmentary sectional view of a portion of another example basketball of the system of FIG. 1.

FIG. 19 is a sectional view of another implementation of basketball 1310, wherein basketball 1310 comprises cover 1316' in lieu of cover 1316 and additionally comprises outer cover panel 1320. In the implementation of basketball 1310 shown in FIG. 19, bladder 1314, windings 1315 and the alternative cover 1316' serve as a carcass for supporting the outer cover panel 1320 which provide a majority of the outer surface of basketball 1310 shown in FIG. 17. Cover 1316' is similar to cover 1316 except that exterior surface of cover 1316' can be alternatively shaped or molded to include outwardly or radially projecting walls, ribs or dividers 1321 in place of valleys 1317. Dividers 1321 partition the exterior of cover 1316 into recesses, cavities or channels receiving outer cover panel 1320. In such an implementation where outer cover panel 1320 extend over cover 1316', the formation of pebbles in cover 1316' may be omitted. As with cover 1316, portions of cover 1316' are translucent or transparent in some implementations. In one implementation, those portions of cover 1316 forming one or more of dividers 1321 are transparent or translucent to allow light to pass through dividers 1321 while other portions of cover 1316 are opaque or have different light transmissive properties.

Outer cover panel 1320 comprises panels of material secured within the channels or cavities formed by dividers 1321 along an exterior of basketball 1310. In one implementation, cover panel 1320 is formed from materials such as leather, synthetic leather, rubber and the like. In one implementation, the exterior surface of such cover panels 1320 includes a pebbled texture. Each cover panel may additionally comprise the fabric backing coated with an adhesive prior to being secured to cover 1316 which may also be alternatively coated with an adhesive. In some implementations, at least portions of one or more of cover panel 1320 are translucent or transparent.

Figure 20:
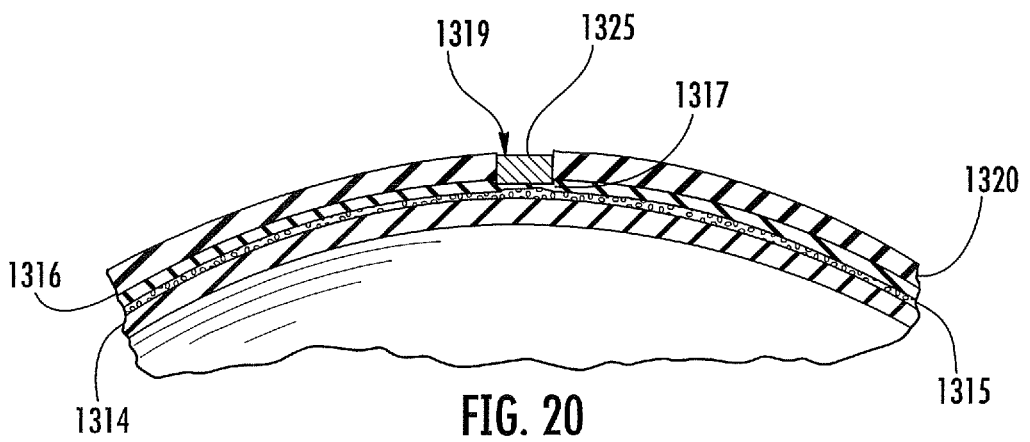
FIG. 20 is a fragmentary sectional view of a portion of another example basketball of the system of FIG. 1.

FIG. 20 is a sectional view of yet another implementation of basketball 1310, wherein basketball 1310 is similar to the basketball shown in FIG. 19, but additionally comprises outer cover panels 1320 and strips 1325. In the implementation of basketball 1310 shown in FIG. 20, bladder 1314, windings 1315 and cover 1316 serve as a carcass for supporting the outer cover panels 1320 and strips 1325 which provide the outer surface of basketball 1310 shown in FIG. 18.

Outer cover panels 1320 comprise panels of material secured to cover 1316 between valleys 1317 along an exterior of basketball 1310. One implementation, cover panels 1320 are formed from materials such as leather, synthetic leather, rubber and the like. In one implementation, the exterior surface of such cover panels 1320 includes a pebbled texture. Each cover panel may additionally comprise the fabric backing coated with an adhesive prior to being secured to cover 1316 which may also be alternatively coated with an adhesive. In some implementations, at least portions of one or more of cover panel 1320 are translucent or transparent.

Strips 1325 comprise elongate bands, tubes, cords or the like secured within valleys 1317 and extending upwardly along adjacent opposite sides of cover panel 1320. The material of strips 1325 has good grip-ability and relatively high coefficient of friction. One implementation, material of the strips 1325 is chosen to match grip and feel of cover panels 1320 so that the grooves 1319 of the basketball 1310 do not include areas of reduced grip-ability on the surface of basketball 1310. The color of the material of strips 1325 can contrast the color of the cover panel 1320 provide visible evidence of grooves 1319. One implementation, strips 1325 are black. In one implementation, strips 1325 comprise urethane-coated microfiber having a thickness of about 1.5 mm. In one implementation, the bottom of such strips 1325 is coated with adhesive so as to adhere to cover 1316 (or carcass) during a final molding step. In one implementation, the material of strips 1325 is translucent or transparent.

As shown by FIG. 17, basketball 1310 additionally comprises a valve assembly 1322 secured to an exterior bladder 1314 (shown in FIGS. 18-20) and terminating at an inflation tube 1323 which extends from the valve assembly 1322 through cover 1316 and through cover panels 1320 (if provided as seen in FIGS. 19 and 20). The valve assembly 1322 is configured to allow air to enter the bladder through use of an inflation needle (not shown) and, when removed, retain the air within the bladder 1314.

Referring to FIG. 17, electronics or circuit electronics 1318 is shown in association with the basketball 310. The electronics 1318 is configured to actively transmit one or more electronic signals used to indicate the location, movement, speed, acceleration, deceleration, rotation and/or temperature of the basketball. Alternatively, electronics 1318 can include a passive circuit that allows for the detection of the location, movement, speed, acceleration, deceleration, rotation and/or temperature of the basketball to be ascertained when subjected to a magnetic field or other sensing system. The electronic 1318 has a weight of less than 1 ounce, and more preferably, a weight of less than 0.5 ounce.

FIG. 17A schematically illustrates one example of electronics 1318. As shown by FIG. 17A, in one implementation, electronics 1318 comprises a substrate 1120, battery 1122, timer 1123, light emitters 1324A, 1324B, 1324C (collectively referred to as light emitters 1324), sound emitter 1326, motion sensor 1328, pressure sensor 1330, location sensor 1331, gripping sensor 1332, transmitter 1133, and controller 1334. Substrate 1120 comprises a chip, platform or panel to support one or more of battery 1122, light emitters 1324, sound emitter 1326, light sensors 1127, motion sensor 1328, pressure sensor 1330, transmitter 1133 and controller 1334. In one implementation, substrate 1120 includes several distinct portions which collectively support the aforementioned components. In one implementation, one or more of such components are supported independent of substrate 1120. For example, in one implementation, controller 1334 may be supported by electronics 1318, wherein light emitters 1324 are supported by different structures at different locations within or throughout basketball 1310.

Battery 1122 comprises an energy storage device with supplies electrical power to one or more of the remaining electronics 1318, such as light emitters 1124. In one implementation, battery 1122 comprises one or more rechargeable electrical storage devices, such as one or more capacitors, supported by substrate 1120 and in electrical connection with light emitters 1124, either directly through one or more electrical wires or traces or through controller 1134. In another implementation, battery 1122 may comprise a battery that is not rechargeable. In one implementation, battery 1122 comprises a removable disposable battery supported independent of substrate 1120 and electrically connected to one or more components supported by substrate 1120.

Timer 1123 comprises one or more devices that track the passage of time. In one implementation, timer 1123 comprises timer circuitry which electronically or digitally tracks time. Although illustrated as being supported by substrate 1120, in other implementations, timer 1123 may comprise a separate component provided as part of basketball 1310, but in communication with electronics 1318. In one implementation, timer 1123 may be manually or automatically synced with other timers associated with a basketball game, scrimmage, practice or the like. In some implementations, timer 1123 may serve as the main or sole timer for a basketball game. In some implementations, timer 1123 functions similar to a stopwatch, being started and stopped in response to signals received through transceiver 1133 or in response to sensed inputs received through grip sensor 1332. As will be described hereafter, signals from timer 1123 or times indicated by timer 1123 may be used by controller 1334 as a basis for adjusting lighting characteristics of light emitters 1324 or output by sound emitter 1326. In some implementations, timer 1123 may be omitted.

Light emitters 1324 comprise devices configured to emit visible light or electromagnetic radiation, wherein the emitted visible light illuminates portions of basketball 1310. In one implementation, light emitters 1324 are supported by substrate 1128 and comprise lighting elements such as light emitting diodes. In other implementations, light emitters 1324 comprise other light emitting elements using other light emitting technologies. Although basketball 1310 is illustrated as including three distinct light emitters 1324, in other implementations, basketball 1310 may include a greater or fewer of such light emitters 1324. Although illustrated as being supported on support substrate 1120, in other implementations, light emitters 1324 may be supported distinct from substrate 1120, such as along an electrical wire, an electrical trace or an electrical string supported elsewhere by basketball 1310.

In the example illustrated, each of light emitters 1324 is configured to emit a different wavelength or different color of visible light. For example, in one implementation, light emitter 1324A emits a red light, light emitter 1324B emits a green light and light emitter 1324C emits a blue light. In one implementation, light emitters 1324 generate different colors of light. In another implementation, light emitters 1324 generate a white light, wherein each of light emitted from the emitter 1324 includes a different filter such that each light emitter 1324 emits a different color of light as a result of the different filters. In one implementation, one of light emitters 1324 includes a diffusion covering which diffuses the generated light to illuminate an expansive area basketball 1310. In one implementation, one of light emitters 1324 includes a light focusing or concentrating covering which focuses the generated light onto a distinct predefined exterior portion of basketball 1310.

In one implementation, one or more of light emitters 1324 may additionally be configured to emit light in a controlled fashion. For example, light emitters 1324 may emit light in a continuous fashion when on or in intermittent or flashing fashion when on. In one implementation, the frequency of the light emitted by light emitters 1324 is fixed, wherein different light emitters 1324 emit light at different frequencies. In one implementation, the frequency of light emitted by light emitters 1324 is adjustable and is under the control of controller 1334.

In various implementations, selected portions of basketball 1310 are formed from materials to facilitate the transmission of light generated by the one or more of light emitters 1324. For example, in one implementation, light emitters 1324 are supported within a central portion or interior of basketball 1310, within bladder 1314. In such an implementation, at least portions of bladder 1314 are formed from one or more materials so as to be translucent or transparent to the light emitted by light emitters 1324. In one implementation, the entirety of bladder 1314 or substantially and entirety of bladder 1314 is translucent or transparent. In another implementation, selected portions of bladder 1314 are translucent or transparent.

In yet other implementations, one or more of light emitters 1324 are configured to emit a display of images or text using light. For example, in one implementation, one or more of light emitters 1324 comprise a liquid crystal display receipt of protected within basketball 1310, but viewable through translucent or transparent portions of basketball 1310. In one implementation, one or more of light emitters 1324 comprise part of an array of organic light emitting diodes (OLEDs) to provide a flexible display within or near a surface of basketball 1310. In such implementations where one or more of light emitters 1324 may display or directly present information, graphics and text may be presented on basketball 1310. Information may be directly communicated instead of indirectly communicating information through the use of colors, intensities, and pulse frequency and duration. In yet other implementations, one or more of light emitters 1324 may comprise other display technologies.

In such implementations where light emitters 1324 are supported within an interior basketball 1310 defined by bladder 1314, at least portions of which are translucent or transparent, portions of windings 1315, cover 1316 (and panels 1320) are also at least partially formed from one or more translucent or transparent materials. As a result bladder 114, winding 1315, cover 1316 and optional cover panel 1320 allow light emitted by light emitters 1324 to pass there through. In one implementation, the entirety of basketball 1310 is translucent or transparent.

In another implementation, selected portions of basketball 1310 are translucent or transparent. In one implementation, the carcass formed by bladder 1314, winding 1315 and cover 1316 are translucent while particular panels 1320 are translucent or transparent and other of panels 1320 are not translucent or transparent. In one implementation, the layers of materials along grooves 1319 are translucent or transparent such that light is only emitted through such grooves 1319 or such that the light seen along such grooves 1319 has different characteristics, such as a different color or different brightness, as compared to light passing through other portions of basketball 1310. The illumination of individual covers or panel 1321 or grooves 1319 visibly indicates rotation of basketball 1310.

In another implementation, stylized portions of basketball 1310 are translucent or transparent while adjacent portions of basketball 1310 are opaque, blocking light. As a result, when light emitters 1324 are emitting light, the stylized portions are emphasized and highlighted. In the example illustrated, basketball 1310 includes a stylized portion shown as a logo 1322 of alpha-numeric characters. In one implementation, logo 1322 is translucent or transparent while adjacent portions adjacent to logo 1322 are not translucent or transparent. In other implementations, basketball 1310 may be provided with other stylized portions which are translucent or transparent while surrounding adjacent portions are opaque. Such stylized portions may be in the form of other logos, designs, graphics, phrases and the like. In one implementation, portions of basketball 1310 adjacent to logo 1322 may also be translucent or transparent, wherein those portions of basketball 310 adjacent logo 322 have a different degree, level or light transmissive characteristic as compared to the surrounding portions. For example, logo 1322 and adjacent portions of basketball 1310 may transmit light to different degrees or may change the color or wavelength of the light differently as compared to one another.

In each of the aforementioned implementations, light emitters 1324 may alternatively be supported external to bladder 1314, between bladder 1314 and the exterior of basketball 1310. In such implementations, light emitters may be supported adjacent or in near vicinity to those particular portions of basketball 1310 which are translucent or transparent. In some implementations, light emitters 1324 are supported directly along the exterior surface of basketball 1310 or within and interior portion of basketball 1310, wherein at least portions of basketball 1310 outside of the light emitter are translucent or transparent.

In one implementation, the outermost surface of basketball 1310 (whether it be cover 1316 as shown in FIG. 18 or cover panels 1320 as shown in FIGS. 19 and 20) is formed therein a depressed or recessed portion 1336 in the shape of the stylized portion or logo. In such an implementation, basketball 1310 additionally comprises light emitter 1324D and protective overlay 1337. Light emitter 1324D comprises a patch or substrate, also in the shape of the stylized portion and the shape of recessed 1336, that supports a plurality of light emitting points such as a plurality of light emitting diodes or other individual light emitters. Light emitter 1324D is secured within recess 1336 and receives power from battery 1122 under the control of controller 1334. Protective overlay 1337 has the shape corresponding to the stylized shaped recess 1336 and is secured within recess 1336 over light emitter 1324D to protect light emitter 1324D. In other implementations, recessed portion 1336, light emitter 1324D and overlay 1337 have different shapes and may have shapes different than one another. In some implementations, light emitter 324D failed to provide a string of lights simply deposited are secured within recess 1336 without the underlying substrate support. Another implementation, overlay 1337 may be omitted, wherein light emitter 1324D is coated with a protective layer or is otherwise sufficiently durable to withstand wear during use of basketball 1310.

In some implementations, light emitters 1324 may be supported at different locations in or with respect to basketball 1310. For example, in one implementation, light emitter 1324A is supported along grooves 1319, light emitter 1324B is supported within an interior of bladder 1314 and light emitter 1324C is supported between bladder 1314 and the exterior of basketball 1310 at a particular region of basketball 1310, such as adjacent to stylized portion 1322. For example, light emitter 1324A may comprise a string of light emitters extending along one or more of grooves 1319. As noted above, the different light emitters may output or emit light in different fashions with respect to one another depending upon location of such light emitters. For example, in one implementation, grooves 1319 may be more brightly illuminated as compared to cover panels 1320 or stylized portion 1322, providing enhanced illumination of basketball 1310 and highlighting rotation of basketball 1310. Logo 1322 may be illuminated with a different color as compared to cover panels 1320 or grooves 1319. In one implementation, one or more of cover panels 1320, grooves 1319 or stylized portion 1322 may be illuminated at different frequencies (continuous or intermittent). For example, grooves 319 may be intermittently illuminated at a first frequency, cover panels 1320 may be intermittently illuminated at a second different frequency and stylized portion 1322 may be continuously illuminated. By intermittently illuminating a selected portion or portions of basketball 1310 or providing such portions with a lower level of illumination, battery power may be conserved. Moreover, by intermittently illuminating selected portions of basketball 1310 or providing such portions with a lower level of illumination as compared to other portions, distractive impacts occurring when certain portions of basketball 1310 are illuminated may be avoided or reduced.

Sound emitter 1326 comprises a device, such as a speaker, to emit auditable sounds in response to control signals from controller 1334. In one implementation, sound emitter 1326 emits beeps. In another implementation, sound emitter 1326 emits speech or words. For example, in one implementation, sound emitter 326 may emit a beep or predefined series or pattern of beeps in response to a particular characteristic detected by either motion sensor 328 or pressure sensor 130, or in response to signals received via transceiver 133. In another implementation, sound emitter 1326 may emit words, such as words of status, such as whether the shot was a made shot or a missed shot, a number indicating a rotational speed of basketball 1310, words of encouragement such as "nice shot" or words of instruction such as "change grip", "increase backspin", or "inflate" in response to a control signals from controller 1334 based upon sensed values from motion sensor 1328, pressure sensor 1130, location sensor 1331, or in response to signals received via transceiver 1133. In some implementations, sound emitter 1326 is omitted from basketball 1310, wherein sounds are not generated or wherein separate and distinct sound emitters outside of basketball 1310 and remote from basketball 1310 are utilized to emit sounds in response to signals transmitted by basketball 1310.

Light sensors 1127 comprise one or more light sensors that detect ambient lighting with respect to basketball 1310. The detected lighting is transmitted to controller 1334. One implementation, light sensors 1127 may be located or supported along the exterior surface of basketball 1310. In other implementations, light sensors 1127 may be embedded below external surface of basketball 1310, wherein overlying portions are transparent or translucent. Ambient lighting conditions detected by light sensors 1127 are communicated to controller 334 for controlling an on-off-state of light emitters 1324 or for adjusting the brightness of light provided by light emitters 1324. In some implementations, light sensors 1127 may be omitted.

Motion sensor 1328 comprises one or more sensors to detect motion of basketball 1310. In one implementation, sensor 1328 comprises an accelerometer, such as a dual axis accelerometer. In one implementation, sensor 1328 comprises a sensor to detect 6 degrees of freedom or motion. Conditions detected by sensor 1328 are transmitted to controller 1334. Signals from motion sensor 1328 may indicate a rotation or spin of basketball 1310, its travel arc, arc height and the like.

Pressure sensor 1130 comprises one or more sensors to detect an internal pressure within bladder 1314. One implementation, sensor 1130 comprises a pneumatic sensor that detects air pressure changes within bladder 1314. The sensor 1130 can be used to monitor air pressure within the bladder 1314 and serve to activate the electronic circuit when a pressure fluctuation is sensed. In this manner, the sensor 130 can be used as part of the control logic of the electronics 1318 to maximize available battery life of the electronic sensor and/or circuit. The electronics 1318 can include shutdown logic that places the electronics of the electronics 1318 into a standby or sleep mode until the basketball 310 is put into play. When the basketball 1310 is moved, passed, kicked or punted, the air pressure within the basketball 1310 can fluctuate or change. This change in air pressure is sensed by the sensor 1130, which then activates the electronics 1318 and places it in an operating mode. In an alternative example implementation, the sensor 1130 can be a piezoelectric sensor The air pressure sensor 1130 can also be used to indicate the air pressure within the bladder 1314 and therefore the pressure of the basketball 1310 itself. The signal produced through the sensor 1130 and from the electronic chip 1318 can be used to confirm that the air pressure is within a desired range or at a specific desired setting. For example, NBA basketballs have a recommended air pressure of 9.5 psi. If the game balls have the pressure sensor 1130, one could use this information to select the most properly inflated basketball. The electronic chip 1318 can also include a temperature sensor for monitoring the temperature of the basketball 1310. In some implementations, pressure sensor 1130 is omitted.

Location sensor 1331 comprises one or more sensors to detect a location of basketball 1310. In one implementation, location sensor 1331 comprises a global positioning system (GPS) sensor/receiver. In another implementation, location sensor 331 may additionally or alternatively comprise a magnetometer which sensors magnetic fields or polar magnetic fields to determine a location or position of basketball 1310, in accordance with the determined basket coordinate system (described above)

In one implementation, the user is instructed to stand at the approximate distance from a ferromagnetic basketball rim or other ferromagnetic reference structure. The user indicates where he or she is located or distance from the ferromagnetic reference structure. The user is then instructed to shoot the basket towards the ferromagnetic reference structure. The system uses the first location as a reference point and the first shot as reference throw (alternatively, the user can also indicate where the ferromagnetic reference structure is located). With the reference shot, the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial shot position. It knows that the user was facing the reference structure at a known distance feet away, and that the user was directly in front of the reference structure. The location and shot are subsequently utilized as a reference. Then, with all subsequent positions for basketball 1310, such references are used to determine subsequent locations of the basketball. In one implementation, subsequent shots are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. In some implementations, one or more of motion sensor 1328, position sensor 1330, or location sensor 1331 are omitted.

Grip sensor 1332 comprises one or more sensors located in or on basketball 310 to detect manual gripping of basketball 1310. For example, in one implementation, grip sensors 1332 comprise pressure, contact other types of sensors on the surface of or within grooves 1318. Such sensors provide electrical signals to electronics 1318 and controller 1334 indicating that basketball 1310 is being manually gripped along grooves 1318 or how grooves 1318 are currently being contacted or gripped by a person's hand. In other implementations, gripping sensors 1332 may be omitted.

Transceiver 1133 comprises a device to transmit and receive signals with respect to a device distinct from basketball 1310. In one implementation, transceiver 1133 facilitates communication between controller 1134 and a local or wide area network such as a phone network or the Internet. In one implementation, transceiver 1133 additionally or alternatively facilitates communication between controller 1134 and a portable electronic device, such as a cell phone, a smart phone, a flash player, a personal data assistant, a notebook, a netbook or laptop computer or the like. In one implementation, portable electronic device 24 may be configured similar to or provided as part of a wristwatch, wrist-top computer, or wristband. Such communication may comprise the transmission of selections or commands to controller 1334 and basketball 1310 or the output of data from basketball 1310 for remote or external analysis, storage and visual or graphical representation, such as on one of portable electronic devices 24, 124, 324, 624 or 824. In one implementation, transceiver 1133 may comprise a Bluetooth transceiver. In another implementation, transceiver 1133 may comprise a radiofrequency transceiver. In some implementations, transceiver 1133 may be omitted.

Controller 1334 comprises one or more integrated circuits or processing units to generate control signals directing the operation of light emitters 1324 and sound emitter 1326 based upon information received from sensors 1127, 1328, 1330, 1331, 1332 and control or data signals received through transceiver 1133. In one implementation, controller 1334 transmits signals from motion sensor 1328 representing sensed shot attributes to portable electronic device 124, 224, 324, 64, 824, wherein the portable electronic device determines the result of the shot, whether the shot is a made or missed basket as described above.

In another implementation, controller 1334 comprises a shot determination module 162 directs processor or processing unit in basketball 1310 to determine whether the shot is just been completed was a made basket or a missed basket. In such an implementation, controller 1334 utilizes the make/miss determination to control the operation of light emitters 1324 and sound emitter 1326. In such an implementation, controller 1334 may transmit the make/miss determinations to portable electronic device 124, 224, 324, 624, 824 are further output on output 44 as described above.

In one implementation, controller 1334 generates control signals that control the emission of light by light emitters 1324. According to a first mode of operation, controller 1334 actuates light emitters 1324A from an off state to an on state in response to control inputs from a person to illuminate basketball 1310 as desired in lowlight conditions. For example, in response to receiving inputs through grip sensors 1332, controller 1334 may turn on light emitters 1324A. In another implementation, controller 1334 generates control signals for light emitters 1324A in response to or based upon signals received from light sensors 1127 to provide overall lighting for basketball 1310. For example, in response to receiving signals from light sensor 1127 indicating that ambient lighting or environmental lighting has fallen below a predefined threshold, controller 1334 may generate control signals turning on light emitters 1324A. In some implementations, in response to receiving signals from light sensors 1127, controller 1334 may actuate light emitters 1324A between one of multiple different lighting levels. For example, as ambient lighting darkens below each of a series of thresholds, controller 1334 may generate control signals increasing the brightness or intensity of light being emitted by light emitters 1324A in a stepwise or continuous fashion. This may be achieved by increasing the wattage of the light being emitted or by increasing the number of light emitting diodes or other lighting elements that are providing light. Similar adjustments to the brightness or intensity of light being emitted by any of the light emitters of basketball 1310 may made by controller 1334 based upon the sensed a detected ambient lighting conditions. As ambient lighting conditions become darker, controller 1334 may generate control signals causing the light emitted by any of the various light emitters of basketball 1310 to be brighter.

In one implementation, controller 1334 generates control signals causing light emitter 1324A to turn on and emit light in response to signals from motion sensor 1328 indicating motion of basketball 310 satisfying a predefined criteria or threshold. For example, in one implementation, controller 1334 generates control signals causing light emitter 1324A (or additional light emitters 1324) to begin to emit light during a basketball shot or free-throw when basketball 1310 is rotating about its axis above a predefined minimum velocity or backspin.

In one implementation, controller 1334 first determines whether basketball 1310 is being shot, such as during a field goal attempt or during a free-throw, versus when basketball 1310 is merely being dribbled or passed. In one implementation, controller 1334 determines whether travel of a ball is a shot or such travel is merely the ball being dribbled or being passed based upon whether the ball is traveling to a parabolic path having an arc that satisfies a predefined threshold. In another implementation, controller 1334 determines whether travel of a ball is a shot or whether such travel is merely the result of ball being dribbled or being passed, based upon a maximum height of the ball travel. For example, controller 1334 may identify travel of the ball as a shot of the ball if controller 1334 receives signals from motion sensor 1328 or location sensor 1331 indicating that the ball is above a height of the basketball rim or has a trajectory estimated by controller 1334 to achieve a height above the basketball rim.

Once controller 1334 has determined that the travel of the ball is a shot, versus a dribble or pass, controller 1334 utilizes additional signals from motion sensor 1328 to determine a rotational velocity and/or backspin of basketball 1310. When the rotational velocity or backspin of basketball 1310 falls below the predefined threshold, controller 334 terminates emission of light by light emitter 1324A. For example, in one implementation, controller 334 may generate control signals causing light emitter 1324A to emit light when the detected backspin from motion sensor 1328 is greater than five RPMs.

In one implementation, controller 1334 adjusts the non-zero emission of light by light emitter 1324A dependent upon signals from motion sensor 1328. For example, controller 1334 may generate control signals causing light emitter 1324A to increase an intensity of light being emitted as the speed of backspin increases. This light intensity adjustment may be made in a continuous ramped fashion or may be made in a stepwise fashion as predefined thresholds are satisfied.

In yet another implementation, controller 1334 adjusts the frequency or duration of pulses of light emitted by light emitter 1324A (and/or other light emitters 1324) dependent upon the sensed motion of basketball 1310. For example, controller 1334 may generate control signals causing light emitter 1324A to emit light pulses having a frequency or duration upon a predefined minimum rotational velocity being detected. In such an implementation, controller 1334 may further generate control signals causing the intensity and/or duration of the light pulses to be increased as the rotational velocity or backspin of basketball 1310 increases.

In one implementation, controller 1334 generates control signals adjusting both the pulse frequency/duration and the light brightness or intensity to indicate different detected characteristics. For example, in one implementation, controller 1334 may adjust or control the frequency/duration of the pulses based upon rotational velocity and the brightness or intensity of such pulses based upon a detected arc or parabolic path of basketball 1310. In other implementations, controller 1334 may adjust or control the frequency/duration of pulses based upon the detected arc of basketball 1310 and the brightness or intensity of such pulses based upon rotational velocity or backspin.

In yet another implementation, controller 1334 generates control signals controlling a color of light being emitted by light emitters 1324 based upon detected motion of basketball 1310. For example, controller 1334 may cause light emitters 1324 to emit a first color of light upon a predefined threshold for rotational velocity or backspin being satisfied and may cause light emitters 1324 to emit different colors of light as different rotational velocity or backspin thresholds are satisfied. Similarly, in another implementation, controller 1334 may cause light emitters 1124 to emit a first color of light upon a predefined threshold for arc being satisfied and may cause light emitters 1324 to emit different colors of light as different arc thresholds are satisfied or exceeded. In some implementations, each of light intensity/brightness, pulse duration/frequency and light color may be controlled and adjusted to indicate when each of different predefined motion thresholds (velocity, arc of travel and the like) are being satisfied.

In one implementation, controller 1334 generates control signals causing light emitter 1324B to differently emit light based upon signals received from pressure sensor 1130. For example, in response to receiving signals from pressure sensor 1130 indicating the internal pressure within bladder 1314, controller 1334 may generate control signals causing light emitter 1324B to emit different colors of light dependent upon inflation level of bladder 1314. Controller 1334 may cause light emitter 324B to emit a red light when basketball 1310 has a pressure below a predefined minimum to indicate basketball 1310 being underinflated. Similarly, controller 334 may cause light emitter 324B to emit a green light when basketball 1310 other pressure above the predefined minimum to indicate basketball 1310 being appropriately inflated. In a similar fashion, controller 1334 may alternatively control light intensity or pulse/duration characteristics to indicate inflation levels for bladder 1314 and basketball 1310.

In one implementation, controller 1334 generates control signals causing light emitter 1324C to differently emit light based upon a detective positioning of basketball 1310, based at least partially upon signals received from location sensor 1331. For example, controller 1334 may generate control signals adjusting an on-off state, a light brightness, a color or a pulse frequency/duration dependent upon the momentary positioning of basketball 1310 (horizontal distance or height) or traveling velocity of basketball 1310. In one implementation, controller 1134 generates control signals causing light emitter 1324C to turn on and emit light for a predefined period of time when signals from location sensor 1331 indicate that basketball 1310 has satisfied a predetermined location threshold, such as when basketball 1310 has passed through the rim/hoop. In another implementation, controller 1134 generates control signals causing the light emitted by light emitter 1124C to change in brightness, color or pulse frequency/duration, for a predetermined time period, after such location thresholds have been satisfied. For example, based upon signals received from motion sensor 1328 and motion of basketball 1310, controller 1334 may determine the initiation of a shot. If controller 1334 further receives signals from location sensor 1331 (and a determination by determination module 162 and/or 362, which is part of controller 1334) indicating that basketball 310 has traveled through the hoop or rim, controller 1334 may generate control signals causing basketball 1310 (or portions of basketball 1310) to change from a darkened to an illuminated state, to change from a continuous illumination to a flashing illumination, to change from a first color to a second color or to change from a first brightness to a second brightness, or combinations thereof.

In yet other implementations, controller 1334 may include an internal timer or may receive signals from transducer 1133 indicating time periods associated with the game being played. Based upon such signals, controller 1334 generates control signals adjusting illumination provided by one or more of light emitters 1324. For example, in one implementation, controller 334 generates control signals adjusting illumination provided by light emitter 1324B based upon shot clock timing. For example, controller 1334 may change the color of light being an emitted from one or more portions of basketball 1310 as an end of a shot clock period is approaching. In another implementation, controller 1334 may adjust a frequency or duration a light pulses being emitted by basketball 1310 as an end of a shot clock time period approaches. Similar adjustments may be made by controller 1334 based upon time allotments for inbounding a basketball or based upon approaching end of a quarter or half. In yet other implementations, controller 1334 may additionally or alternatively generate control signals making light adjustments that indicate the actual end of a time period, such as the end of a shot clock time period or the end of a quarter or half. In such an implementation, basketball 1310 may be utilized to provide shot clock timing, ball possession limitations or game timing for informal basketball games at playgrounds or other basketball court facilities where shot clock or game clocks may not be available. In such an implementation, controller 1334 may receive inputs through transceiver 1133 or through contact sensors on ball 1310 establishing a custom shot clock time period or game.

In some implementations, controller 1134 may adjust lighting characteristics of basketball 1310 based upon a comparison of detected motion or travel of basketball 1310 (as determined using signals from motion sensor 1328, pressure sensor 1330 and location sensor 1331) or shot accuracy or results (described above) with stored or obtained ball travel results achieved by a celebrity. Although controller 1334 may include a memory serving as a celebrity storage for storing user data pertaining to travel of the ball, in other implementations, controller 1334 may obtain celebrity ball travel characteristics or results from a remote location using transceiver 1133. For example, celebrity ball travel results are characteristics may be alternatively provided at a remote server which may be accessed across a local or wide area network.

Based upon signals received from one or more of motion sensor 1328, pressure sensor 1330 and location sensor 1331, compares a person's results with that of a celebrity and adjust lighting characteristics of basketball 1310 accordingly. For example, in one implementation, controller 1334 may compare detected parameters or characteristics of a user's backspin and/or arc of a basketball with a celebrity's shot of the basketball. For example, controller 334 may compare of a user's basketball shot with the basketball shot by a popular basketball celebrity such as Lebron James of the Miami Heat or former player Michael Jordan of the Chicago Bulls. Based upon this comparison, controller 1334 generates control signals causing one or more lighting characteristics of basketball 1310 to be adjusted. For example, if a particular basketball shot by user has characteristics that satisfy predefined thresholds typical of a celebrity college or professional basketball player, controller 1334 may change the color of light being emitted by basketball 310 during the basketball shot and/or for a predetermined period of time following the basketball shot, providing a user with a reward or complement and encouragement. In such an implementation, controller 334 and the light being emitted by basketball 1310 provide a user with a motivational tool by allowing the user to visually determine or see how his or her individual parameters pertaining to travel of the basketball compare to the same individual parameters of a celebrity having above-average skills in the sport. Similar implementations may be made with respect to other aspects such as free throws.

In some implementations, controller 1334 stores and keeps track of results, wherein controller 1334 adjusts lighting characteristics of basketball 1310 as different predetermined thresholds or milestones are met. For example, in one implementation, controller 1334 tracks free-throw makes versus attempts, wherein controller 1334 generates different control signals causing basketball 1310 to emit a different characteristic light (such as a different color, frequency, brightness etc.) based upon the current free-throw percentage of a person using basketball 1310. For example, when a player achieves a free-throw percentage of at least 50%, controller 1334 generates control signals causing a first color light to be emitted by basketball 1310 and when the player achieves a second greater free-throw percentage of say, at least, 60%, controller 334 generates control signals causing a second different color light to be emitted by basketball 1310. If a player's free-throw percentage falls below a predefined threshold, controller 1334 generate control signals once again changing the color of light emitted by basketball 1310. In such an implementation, the color, pulse frequency, brightness etc. of basketball 1310 provides the player with a visual motivational tool. In some implementations, the visible color may further indicate to others, such as a player's coach, the current free-throw percentage, offering additional opportunities for encouragement. In addition to tracking free throw percentages, controller 1334 may be configured to track and adjust lighting characteristics based upon other statistics such as three point shot percentage and two point shot/field goal percentages.

In one implementation, transceiver 1133 is configured to read or receive player identification signals, wherein controller 1334 associates and stores data for multiple players in a game or practice. For example, in one implementation, each of multiple players may include a distinct radio frequency identification (RFID) tag. Transceiver 1133 or another RFID reading device provided as part of basketball 1310 is configured to read the particular player RFID tag when the particular player is currently handling basketball 1310. If the particular player shoots the basketball, data such as make/miss, backspin, arc and the like, sensed by one or more sensors of basketball 1310, is stored in a memory on electronics 1318. Such data may be subsequently transmitted by transceiver 1133 to an external or remote portable electronic device for further statistical analysis and visual representation. As a result, basketball 1310 allows individual players in a practice or an informal pickup game to later view their statistics (shot attempts, field-goal percentage, three-point shots, free-throw percentage, shot mapping) on their portable electronic devices, on a website or computer.

In some implementations, basketball 1310 may have dedicated portions of cover 1312 which are translucent or transparent for outwardly transmitting light indicative of different sensed parameter characteristics. For example, in one implementation, basketball 1310 may have a translucent or transparent portion dedicated for transmitting light indicating the current pressure level of bladder 1314 of basketball 1310. For example, logo 1322 may be translucent or transparent so as to transmit light by light emitter 1324B indicating a current pressure within bladder 1314, wherein other transparent or translucent portions of basketball 1310 do not emit light from light emitter 1324B indicating pressure, but emit light from other light emitters 1324 to provide other information. Similarly, other particular portions of the basketball 1310 may be dedicated to present particular predefined information. For example, in one implementation, grooves 1319 may transmit light from a light emitter 1324A indicating rotational velocity or spiral efficiency.

In one implementation, controller 1134 additionally controls one or more light emitters 1324 based upon signals received from grip sensor 1332. In one implementation, in response to receiving signals indicating that grooves 1318 are being manually contacted or gripped, controller 1334 actuates one or more of sensors 1328, 1330, 1331 from a standby or sleep mode or state to an active state, effectively turning on several the functions of basketball 1310. In such an implementation, battery power is conserved. In one implementation, in response to receiving signals indicating grooves 1319 are no longer being manually contacted or gripped, controller 1334 initiates or begins countdown of a timer counting down to termination of lighting of one or more of light emitters 1324. In such an implementation, after prolonged periods of nonuse or undetected gripping of grooves 1318 or other portions of basketball 1310, light emitters 324 are turned off to conserve power.

In yet other implementations, controller 1334 may utilize signals received from grip sensor 1332 for receiving input, commands or selections. For example, grip sensor 1332 may comprise a plurality of individual pressure or contact sensors, wherein different combinations of touches (as detected by pressure or contact) correspond to different commands or selections. In one implementation, controller 1334 may offer a person with a variety of selectable options or settings such as options as to predefined sets of settings based upon a person's current skill level (beginner, amateur, high school, college, professional), wherein a person may select one of the set of settings by contacting grooves 1319 in a predefined manner at predefined locations or in a predefined order during a setup phase. In another implementation, controller 1134 may offer a person with a variety of selectable options or settings as to how information is communicated (if at all) through light emitters 1324 or sound emitter 1326, whether through changes in on-off states, color, duration, pulse frequency or duration, sound and the like, wherein a person may select one or more of the communication options using an input, such as input 641 on portable electronic device 624 in a setup or adjustment phase. In another implementation, controller 1334 may alternatively or additionally offer a person with a variety of selectable officer settings as to what portions of basketball 1310 are illuminated or as to what portion of basketball 1310 is assigned to communicating particular information through illumination, wherein a person may select one or more of the basketball portion illumination options by contacting grooves 1319 or logo 1322 in a predefined matter at predefined locations or in a predefined order during a setup phase. For example, by contacting logo 1322 in a first particular manner during a setup phase, a person may establish a first setting wherein grooves 1319 communicate backspin and logo 1322 communicates shot clock information through illumination and by contacting logo 1322 in a second different particular manner during a setup phase, a person may establish a second setting wherein lighting of grooves 1319 communicate shot clock information while logo 1322 communicates backspin or arc information through illumination. In such implementations, once selections or commands are made, controller 1334 may generate control signals causing light emitters 1324 or sound emitter 1326 to confirm the selection using illumination or sound.

Transceiver 133 comprises a device to transmit and receive communication signals. In one implementation, transceiver 1133 is configured to facilitate communication between controller 334 and an external electronic device. In one implementation, transceiver 1133 is configured to facilitate communication between controller 1334 and a portable electronic device, such as a smart phone, cellular phone, personal data assistant, notebook, tablet computer, laptop computer, display eyewear, an electronic wrist band, a wrist-top computer, flash memory player (IPOD) and the like using radiofrequency (RF) waves, radio waves, Bluetooth, a ZigBee low power digital radio signals, Wi-Fi, near field communication and the like. In one implementation, controller 1334 utilizes transceiver 1133 to communicate with a portable electronic device so as to allow a person to receive data or information regarding basketball 1310 and to further potentially store such information for later review or analysis. For example, controller 1334 may utilize transceiver 1133 to communicate information pertaining to motion of basketball 310 such as backspin or arc, inflated pressure of bladder 1314 of basketball 1310, the success of the free-throw or other shot, allowing correlation between motion of basketball 1310 (such as backspin and/or arc) to success of a shot or free-throw.

In one implementation, controller 1334 further utilizes transceiver 1133 to additionally receive commands or settings. For example, in one implementation, controller 1334 may offer a person with a variety of selectable options or settings such as options as to predefined sets of settings based upon a person's current skill level (beginner, amateur, high school, college, professional), wherein a person may select one of the set of settings using a portable electronic device which is in communication with controller 1334 using transceiver 1133. Each of the different skill levels may have different thresholds for triggering light characteristic adjustments by controller 1334. In another implementation, controller 1334 may offer a person with a variety of selectable options or settings as to how information is communicated (if at all) through light emitters 1324 or sound emitter 1326, whether through changes in on-off states, color, duration, pulse frequency or duration, sound and the like, wherein a person may select one or more of the communication options by communicating with controller 1334 using transceiver 1133 and a portable electronic device or another communication device. In another implementation, controller 1334 may alternatively or additionally offer a person with a variety of selectable options are settings as to what portions of basketball 1310 are illuminated or as to what portion of basketball 1310 is assigned to communicating particular information through illumination, wherein a person may select one or more of the basketball portion illumination options by communicating to controller 1334 using transceiver 1133. For example, a person may establish a first setting wherein grooves 1319 communicate backspin and logo 1322 communicates inflation pressure through illumination and a second setting wherein grooves 1319 communicate backspin while logo 1322 communicates detected arc of a shot/free-throw through illumination. In such implementations, once selections or commands are made, controller 334 may generate control signals causing light emitters 1324 or sound emitter 1326 to confirm the selection using illumination or sound.

In other implementations, in lieu of communicating with external or remote electronic devices in a wireless fashion, transceiver 1133 may alternatively facilitate communication using contact or induction. For example, transceiver 133 and alternatively to indicate using an RFID tag or through an electrical jack or plug. In one implementation, an electrical contact may be situated along or about inflation port 1322 (or a separate independent port), allowing a jack or plug-in to be inserted into port 322 and into contact with the electrical contacts to facilitate "wired" communication with controller 1334. In other implementations, transceiver 1133 may be omitted.

Figure 21:
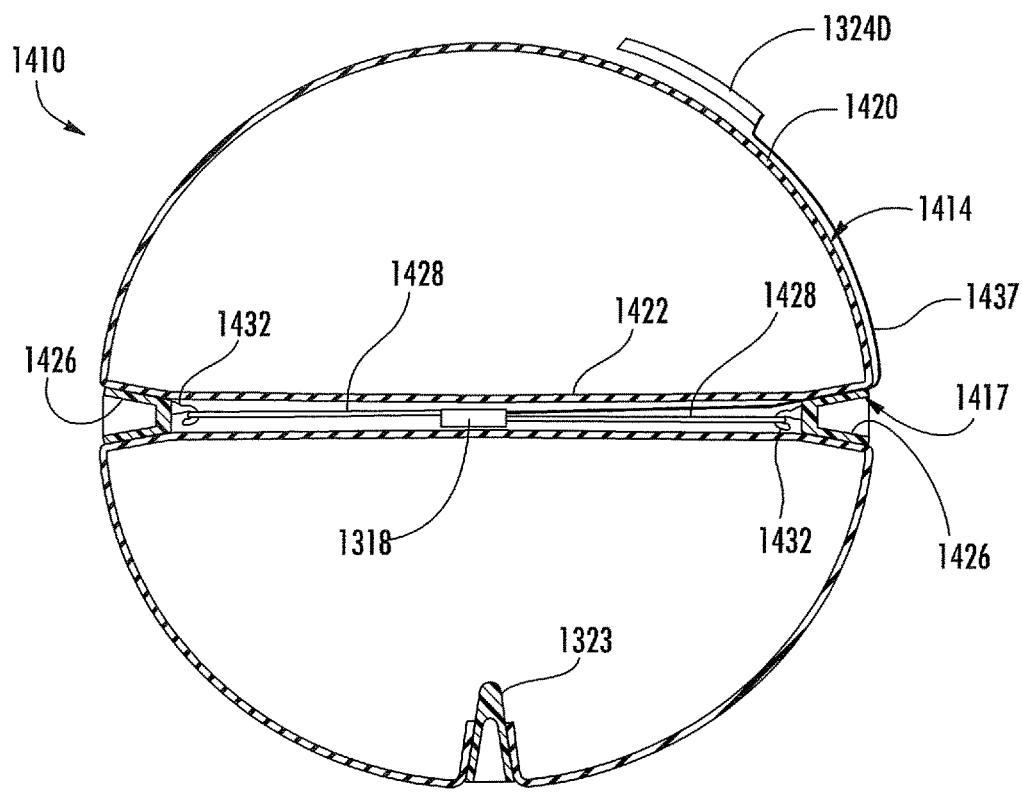
FIG. 21 is a sectional view of a portion of another example basketball of the system of FIG. 1.

FIG. 21 is a sectional view illustrating a portion of basketball 1410, an example implementation of basketball 1310. Basketball 1410 is similar basketball 1310 except that basketball 1410 is illustrated as specifically including bladder 1414 in lieu of bladder 1314 and additionally comprises chip mounting system 1417. Although not illustrated in FIG. 21, basketball 1410 additionally comprises one of the basketball configurations shown in FIGS. 18-20.

Bladder 1414 is similar to bladder 1314 except the bladder 1414 comprises a spherical inflatable outer wall 1420 and an internal tubular portion 1422. Internal tubular portion 1422 comprises a flexible tubing extending through an intersecting a center point of basketball 1410 and outer wall 1420. As a result, outer wall 1420 and tubular portion 1422 form a donut-like inflatable interior which encircles tubular portion 1422. Tubular portion 1342 is sized receive electronic components, such as circuit electronics 1318 (described above). Tubular portion 1422 facilitates insertion of circuit electronics 1318 within basketball 1410 after bladder 1414 has been inflated. As a result, in some implementations, the positioning of circuit electronics 1318 within basketball 1410 may be performed after one or more of cover 1316, 1316" and panels 1320 have been formed upon the inflated bladder 1414. As a result, circuit electronics 1318 may avoid being subjected to substantially high temperatures during the forming of cover 1316, 1316" and panels 1320. Because tubular portion 1422 continuously extends from a first side of bladder 1414 to a second opposite side of bladder 1414, circuit electronics 1318 and chip mounting system 1417 may be strong through bladder 1414. In other implementations, tubular portion 1422 may comprise a blind tubular member or a tubular member having one closed off end, wherein the closed off end is secured in place within bladder 1414.

In implementations where circuit electronics 1318 comprises one or more of light emitters 1324 such that light emitters 1324 are located within tubular portion 1422, those portions of tubular portion 1422 about circuit electronics 1318 or adjacent to the one or more light emitters 1324 are translucent or transparent. As a result, light emitted by such light emitters 1324 a pass-through tubular portion 1422 and illuminate the interior bladder 1414, wherein at least portions of wall 1420 of bladder 1414 are also translucent or transparent. In implementations where light emitters 1324 are omitted, tubular portion 1422 may be opaque.

Chip mounting system 1417 mounts and supports electronic component or electronics 1318 within bladder 1414 and within tubular portion 1422. Chip mounting system 1417 comprises plugs 1426 and flexible member 1428. Plugs 1426 are configured to be inserted and retained in opposite ends of tubular member 1422 proximate an exterior of bladder 1414. Plugs 1426 are each connected to an opposite end of flexible member 1428. In the example illustrated, each of plugs 1426 comprises a hook 1432 about which flexible member 1428 extends. In other implementations, plugs 1426 may be secured to flexible member 1428 in other fashions.

Flexible member 1428 comprises an elongate flexible string, line, band, strap, cable, rope, wire or the like extending between plugs 1426. Flexible member 1428 supports circuit electronics 1318 at a central location within tubular portion 1422. In one implementation, flexible member 1428 comprises a resiliently stretchable member, which when taught, resiliently holds circuit electronics 1318 in place. In other implementations, other structures which are not necessarily flexible or resilient may be positioned within tubular portion 1422 to retain circuit electronics 1318 centrally in place within tubular portion 1422. In some implementations, flexible member 1428 may be omitted, wherein circuit electronics 1318 is positioned within tubular portion 1422 and wherein, upon stretching of tubular portion 1422, tubular portion 1422 constricts about and into gripping contact with circuit electronics 1318 to retain circuit electronics 1318 in place.

In the example illustrated, chip mounting system 1417 additionally comprises multi-lead wire 1437. Multi-lead wire 1437 extends from the electronics 1318, through tubular portion 1422, between tubular portion 1422 and plug 1426 and along an exterior of bladder 1414 to light emitter 1324D and any grip sensors 1132. In one implementation, wire were 1437 extends along and in contact with exterior surface of bladder 1414. In another implementation, wire 1437 extends between any of the various layers between bladder 1414 and outer cover 1312 (shown in FIG. 17). As shown by FIGS. 17*a* and 21, tubular portion 1422 of bladder 1414 facilitates location of light emitters 1324 and electronics 1318 at a central portion within basketball 1410 and facilitates communication between electronics 1318 and light emitter 324D and/or grip sensor 332, external to bladder 1414, without wire 1437 passing through wall of bladder 1414. As a result, wire 1437 is less likely to impair the structural integrity of bladder 1414.

Figure 22:
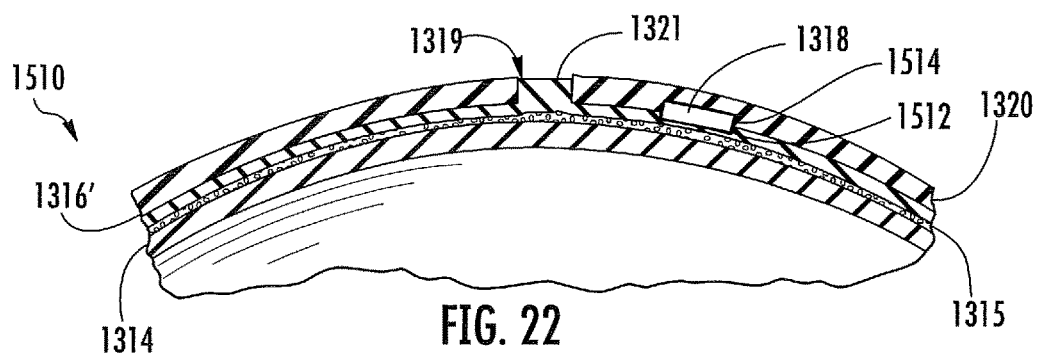
FIG. 22 is a sectional view of a portion of another example basketball of the system of FIG. 1.

FIG. 22 is a sectional view illustrating basketball 1510, another example implementation of basketball 1310. Basketball 1510 is similar to basketball 1310 except that basketball 1510 is specifically illustrated as having circuit electronics 1318 located external to bladder 1314. In the example illustrated, circuit electronics 1318 is supported adjacent to windings 1315 within recesses formed within cover 1316' and cover panel 1320. In some implementations, depending upon a thickness of cover 1316' and cover 1318, circuit electronics 1318 may be supported entirely within a recess of cover 1316' or of cover panel 1320. In one implementation, circuit electronics 1318 and light emitters 1324 are located behind logo 1322. In one implementation, light emitters 1324 may illuminate an entire region of at least one of panels 1320. In some implementations, the circuit electronics 1318 shown in FIG. 17 may be added to basketball 1410 shown in FIG. 21, where basketball 1410 comprises two circuits or electronics 1318 or wherein basketball 1410 comprises two separate light emitters at different locations, one light emitter centrally located within tubular portion 1422 and other light emitter outwardly located between winding 1315 and cover panel 1320.

In one implementation, basketball 1410 is formed by molding recess 1512 within cover 1316' and forming recess 1514 in panel 1320 such that circuit electronics 1318 is captured between cover 1316' (or windings 1315 where recess 1512 extends completely through cover 1316') and cover panel 1320. In other implementations, circuit electronics 1318 may be secured adjacent to bladder 1414, wherein windings 1315 extend about and over circuit electronics 1318. In yet other implementations, circuit electronics 1318 and/or light emitters 1324 may be secured at other locations.

Figure 23:
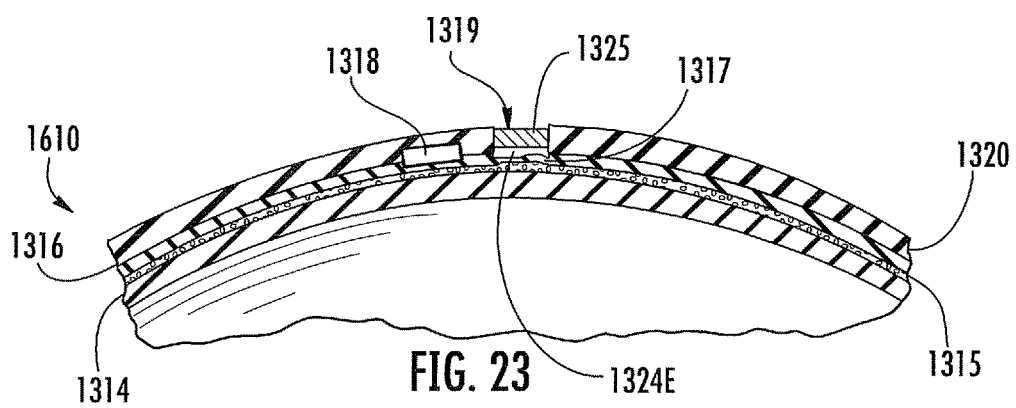
FIG. 23 is a sectional view of a portion of another example basketball of the system of FIG. 1.

FIG. 23 is a sectional view illustrating basketball 1610, another example implementation of basketball 1310. Basketball 1610 is similar to basketball 1310 except that basketball 1510 is specifically illustrated as having circuit electronics 1318 located external to cover 1316 and is having a light emitter 1324E within valley 1317 below strip 1325. In the example illustrated, circuit electronics 1318 is supported adjacent to cover panel 1320 within recesses formed within cover panel 1320. In one implementation, circuit electronics 1318 and light emitters 1324 are located behind logo 1322 (shown in FIG. 17).

Light emitter 1324E comprises a device to emit light in response to control signals from controller 1334 located on circuit electronics 1318. In the example illustrated, light emitter 1324E is located within valley 1317 (described above with respect to FIG. 17) below strip 1325 so as to illuminate groove 1318. In such an implementation, at least portions of strip 1325 are translucent or transparent. In one implementation, light emitter 1324E (schematically shown) comprises a string of multiple light emitting elements such as a string of light emitting diodes. Although basketball 1610 is illustrated as including light emitter 1324E in a single groove 1318, light emitters may also be provided in other grooves 1319 of basketball 1610.

In some implementations, basketball 1610 may additionally comprise the circuit electronics 1318 and chip mounting system 1417 shown and described above with respect to FIG. 21. In such an implementation, light emitters provided on the centrally located circuit electronics 1318 within tubular portion 1422 illuminates larger more expansive areas while light emitters located within groove 1318 or adjacent to cover 1320 may illuminate specific designated portions of basketball 1610.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A basketball shot determination system for use with a basket and a portable electronic device including a data acquisition device, a processing unit, a memory and an output device, the system comprising:
   a basketball;
   at least one sensor carried by the basketball;
   a non-transient computer-readable medium containing code to direct the processor to:
   obtain at least one attribute of a shot of the basketball towards the basket from the data acquisition device, the at least one attribute being sensed by the at least one sensor or derived from signal output by the at least one sensor;
   determine whether the shot is a made basket shot or a missed basket shot solely by comparing the at least one attribute of the shot to one or more predetermined signature characteristics of a made basket selected from a group of signature characteristics of a made basket consisting of: acceleration over time, spin axis (spin angle); spin rate, launch direction, launch coordinates, launch angle, backboard vibrations and rim vibrations; and
   present output to a person based on the determination of whether the shot is a made basket shot or a missed basket shot.

2. The system of claim 1, wherein the code further directs the processor to display information regarding a plurality of shots by the person.

3. The system of claim 2, wherein the information includes a shooting percentage based upon a total number of shot attempts and a number of individual shots, out of the total number of shot attempts, determined to be a made basket shot, wherein the determination of whether each individual shot is a made basket is by comparison of the at least one attribute of each individual shot to said one or more predetermined signature characteristics of a made basket.

4. The system of claim 1, wherein the code includes instructions for directing the processing unit to:
   establish a coordinate system for a basketball court and determine launch coordinates of each basketball shot based upon signals from the at least one sensor carried by the basketball; and
   present a graphical representation on the output device, and wherein the graphical representation comprises a diagram of at least a portion of the basketball court and a representation of shooting percentages from different launch coordinates on the basketball court, wherein the different launch coordinates on the basketball court are graphically presented on the diagram of the at least a portion of the basketball court.

5. The system of claim 4, wherein the graphical representation further comprises an indication of a number of shot attempts from different launch coordinates on the basketball court, wherein the different launch coordinates on the basketball court for the shot attempts are graphically presented on the diagram of the at least a portion of the basketball court.

6. The system of claim 5, wherein the graphical representation indicates a first number of shot attempts at a first location on the basketball court and a second number of shot attempts at a second location on the basketball court different than the first location.

7. The system of claim 5, wherein the graphical representation comprises a changing animation of shot percentages from different locations of the court, wherein the animation presents changes in shot percentages over time from different locations of the court, wherein the animation is presented directly on the graphical representation of the at least a portion of the basketball court and wherein the animation presents a first series of changes in shot percentages over time for a first location beyond the three-point arc, a second series of changes in shot percentages over time, different than the first series of changes, for a second location beyond the three-point arc, a third series of changes in shot percentages over time for the first location within the three-point arc and a fourth series of changes in shot percentages over time, different than the third series, for a second location within the three-point arc.

8. The system of claim 4, wherein the graphical representation comprises a heat map of made and missed shots on the basketball court from the different launch coordinates.

9. The system of claim 8, wherein the heat map includes colors that vary depending upon the shooting percentage of the person at the different launch coordinates on the basketball court.

10. The system of claim 1, wherein the code includes instructions for directing the processing unit to present a statistical comparison on the output device indicating differences of at least one of shot release speed, launch angle, shot direction, and spin for made shots and missed shots.

11. The system of claim 1, wherein the code includes instructions for directing the processing unit to track shooting percentages, to compare the tracked shooting percentages with corresponding shooting percentages of a celebrity basketball player and to output the comparison on the output device.

12. The system of claim 1, wherein the code includes instructions for directing the processing unit to share shooting results to a social media forum.

13. The system of claim 1, wherein the code includes instructions for directing the processing unit to track shooting percentages, to compare the tracked shooting percentages with corresponding shooting percentages of another person and to output the comparison on the output device.

14. The system of claim 1, wherein the data acquisition device, processing unit, the memory and the output device are part of a phone.

15. The system of claim 1 further comprising a made shot signature storage containing the one or more predetermined signature characteristics of the made shot.

16. The system of claim 15, wherein the made shot signature storage is remote from the portable electronic device.

17. The system of claim 15, wherein the made shot signature storage is part of the portable electronic device.

18. The system of claim 1, wherein the code includes instructions to direct the processing unit to determine whether the shot is a made basket are remote from the portable electronic device and are in communication with the portable electronic device across a network.

19. The system of claim 1, wherein the code includes instructions to direct the processor to distinguish between different types of made basket shots and to classify each made basket shot by type based upon the at least one sensed attribute of the made basket shot and to store the determined classification type of the made basket shot, wherein the different classification types comprise (1) a swish shot, (2) a bank shot, (3) a bank and rim shot and (4) a rim shot.

20. The system of claim 1, wherein the determination of whether the shot is a made basket shot or a missed basket shot is made solely by comparing acceleration over time of the shot to acceleration over time of at least one previously made basket shot.

21. The system of claim 20, wherein the code includes instructions to direct the processor to distinguish between different classification types of made basket shots and to classify each made basket shot by type based solely upon comparing acceleration over time of the shot to acceleration over time of previous made basket shots for each of the different classification types of made basket shots, wherein the different classification types comprise at least two different shot types selected from a group of shot classification types consisting of (1) a swish shot, (2) a bank shot, (3) a bank and rim shot and (4) a rim shot.

* * * * *

UNITED STATES PATENT AND TRADEMARK OFFICE
CERTIFICATE OF CORRECTION

PATENT NO. : 9,656,143 B2
APPLICATION NO. : 14/204932
DATED : May 23, 2017
INVENTOR(S) : Thurman et al.

It is certified that error appears in the above-identified patent and that said Letters Patent is hereby corrected as shown below:

On the Title Page

Item (72) Inventors: should read - Robert T. Thurman, Plainfield, IL (US); Kevin L. Krysiak, Palatine, IL (US); Harri Hohteri, Helsinki, Finland (FI), Jirka Poropudas, Helsinki, Finland (FI), Tuukka Nieminen, Espoo, Finland (FI) and Vesa-Matti Mäkinen, Helsinki, Finland (FI).

Signed and Sealed this
Eleventh Day of December, 2018

Andrei Iancu
*Director of the United States Patent and Trademark Office*